US009541992B2

(12) United States Patent
Lee et al.

(10) Patent No.: US 9,541,992 B2
(45) Date of Patent: Jan. 10, 2017

(54) METHOD OF PERFORMING DYNAMIC VOLTAGE AND FREQUENCY SCALING OPERATION, APPLICATION PROCESSOR PERFORMING METHOD, AND MOBILE DEVICE COMPRISING APPLICATION PROCESSOR

(71) Applicants: Jae-Gon Lee, Yongin-si (KR); Taek-Kyun Shin, Gawngmyeong-si (KR); Sang-Jung Jeon, Yongin-si (KR); Jin-Sub Choi, Yongin-si (KR)

(72) Inventors: Jae-Gon Lee, Yongin-si (KR); Taek-Kyun Shin, Gawngmyeong-si (KR); Sang-Jung Jeon, Yongin-si (KR); Jin-Sub Choi, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 346 days.

(21) Appl. No.: 14/022,260

(22) Filed: Sep. 10, 2013

(65) Prior Publication Data
US 2014/0075224 A1 Mar. 13, 2014

(30) Foreign Application Priority Data
Sep. 10, 2012 (KR) ........................ 10-2012-0099753

(51) Int. Cl.
*G06F 1/32* (2006.01)

(52) U.S. Cl.
CPC ............. *G06F 1/3296* (2013.01); *G06F 1/324* (2013.01); *G06F 1/3243* (2013.01); *Y02B 60/1217* (2013.01); *Y02B 60/1239* (2013.01); *Y02B 60/1285* (2013.01)

(58) Field of Classification Search
CPC ................ G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS

| 5,485,127 A | 1/1996 | Bertoluzzi et al. |
| 5,586,308 A | 12/1996 | Hawkins et al. |
| 5,727,193 A | 3/1998 | Takeuchi |
| 5,745,375 A | 4/1998 | Reinhardt et al. |
| 6,205,537 B1 * | 3/2001 | Albonesi ............... G06F 15/161 712/229 |

(Continued)

FOREIGN PATENT DOCUMENTS

| JP | 4344194 | 10/2009 |
| JP | 2011-019044 | 1/2011 |
| KR | 0975747 | 8/2010 |

*Primary Examiner* — Thomas Lee
*Assistant Examiner* — Mohammad A Rahman
(74) *Attorney, Agent, or Firm* — Volentine & Whitt, PLLC

(57) ABSTRACT

A method of performing a dynamic voltage and frequency scaling operation comprises controlling a clock management unit (CMU) to predict an operating state of a central processing unit (CPU) and to provide operating frequency information to a power management integrated circuit (PMIC) based on the predicted operating state of the CPU, the operating frequency information indicating a change of an operating frequency of an application processor, and controlling the PMIC to change an operating voltage of the application processor based on the operating frequency information provided from the clock management unit.

20 Claims, 17 Drawing Sheets

(56) References Cited

U.S. PATENT DOCUMENTS

| | | | |
|---|---|---|---|
| 6,766,460 B1 * | 7/2004 | Evoy | G06F 1/3203 |
| | | | 712/E9.068 |
| 7,133,944 B2 | 11/2006 | Song et al. | |
| 7,594,126 B2 | 9/2009 | Yun et al. | |
| 7,915,910 B2 | 3/2011 | Von Kaenel | |
| 2009/0049314 A1 | 2/2009 | Taha et al. | |
| 2009/0125293 A1 * | 5/2009 | Lefurgy | G06F 11/3447 |
| | | | 703/18 |
| 2009/0158061 A1 * | 6/2009 | Schmitz | G06F 1/3228 |
| | | | 713/300 |
| 2010/0023653 A1 | 1/2010 | Rozen et al. | |
| 2010/0146316 A1 * | 6/2010 | Carter | G06F 1/3203 |
| | | | 713/322 |
| 2011/0083021 A1 | 4/2011 | Floyd et al. | |
| 2011/0095794 A1 | 4/2011 | Dubost et al. | |
| 2011/0113269 A1 | 5/2011 | Park | |
| 2011/0113270 A1 | 5/2011 | Carter et al. | |
| 2011/0140733 A1 | 6/2011 | Von Kaenel | |

* cited by examiner

METHOD OF PERFORMING DYNAMIC VOLTAGE AND FREQUENCY SCALING OPERATION, APPLICATION PROCESSOR PERFORMING METHOD, AND MOBILE DEVICE COMPRISING APPLICATION PROCESSOR

CROSS-REFERENCE TO RELATED APPLICATION

This application claims priority under 35 USC §119 to Korean Patent Application No. 10-2012-0099753 filed on Sep. 10, 2012, the subject matter of which is hereby incorporated by reference.

BACKGROUND OF THE INVENTION

Embodiments of the inventive concept relate generally to a dynamic voltage and frequency scaling (DVFS) technique. More particularly, certain embodiments of the inventive concept relate to a method of performing a DVFS operation, an application processor performing the DVFS operation, and a mobile device comprising the application processor.

Mobile devices commonly include an application processor for controlling operations of one or more functional modules. Such functional modules may include, for instance, a communication module, a multimedia module, and so on. Because mobile devices generally use a battery for power, there is a general demand for the application processor and the functional modules to consume a low amount of power. Nevertheless, the application processor often consumes a relatively high amount of power compared to other components in the mobile device. Thus, many mobile devices employ a DVFS technique that predicts an operating state of a central processing unit (CPU) in the application processor and dynamically changes an operating frequency and an operating voltage of the application processor based on the predicted operating state.

Where a DVFS operation is performed for the application processor in the mobile device, the application processor provides operating frequency information indicating a change (i.e., an increase or a decrease) of the operating frequency to a power management integrated circuit (PMIC). The operating frequency information is generated based on a predicted operating state of the CPU, and the PMIC changes the operating voltage of the application processor based on the operating frequency information.

In conventional DVFS techniques, interaction between the application processor and the PMIC may have limited speed due to software such as an operating system (OS), which controls interactions between the application processor and the PMIC. As a result, the conventional DVFS techniques may fail to change, in real-time, the operating frequency and the operation voltage of the application processor based on the predicted operating state.

SUMMARY OF THE INVENTION

In one embodiment of the inventive concept, a method of performing a dynamic voltage and frequency scaling operation comprises controlling a clock management unit (CMU) to predict an operating state of a CPU and to provide operating frequency information to a PMIC based on the predicted operating state of the CPU, the operating frequency information indicating a change of an operating frequency of an application processor, and controlling the PMIC to change an operating voltage of the application processor based on the operating frequency information provided from the clock management unit.

In another embodiment of the inventive concept, an application processor comprises a central processing unit configured to operate based on a clock signal, a clock generating unit configured to generate the clock signal, and a CMU configured to predict an operating state of the central processing unit, to provide operating frequency information to a PMIC based on a predicted operating state of the central processing unit, and to change an operating frequency of the application processor based on the predicted operating state of the central processing unit, the operating frequency information indicating a change of the operating frequency of the application processor corresponding to a frequency of the clock signal. An operating voltage of the application processor supplied by the PMIC is changed based on the operating frequency information.

In yet another embodiment of the inventive concept, a mobile device comprises at least one functional module, an application processor configured to predict an operating state of a CPU, to output operating frequency information based on a predicted operating state of the CPU, and to change an operating frequency of the application processor based on the predicted operating state of the CPU in hardware, the operating frequency information indicating a change of the operating frequency of the application processor, and a PMIC configured to change an operating voltage of the application processor based on the operating frequency information.

In yet another embodiment of the inventive concept, a method is provided for operating an apparatus comprising an application processor, a CMU, and a PMIC. The method comprises operating the CMU to predict an operating state of a CPU in the application processor and to provide operating frequency information to the PMIC based on the predicted operating state, operating the PMIC to increase an operating voltage of the application processor where the operating frequency information indicates an increase in an operating frequency of the application processor, and operating the PMIC to decrease the operating voltage of the application processor where the operating frequency information indicates a decrease in the operating frequency of the application processor.

These and other embodiments of the inventive concept may potentially prevent unnecessary power consumption resulting from a phenomenon in which an operating voltage of an application processor is unnecessarily high compared to an operating frequency of the application processor, and it may also prevent a malfunction resulting from a phenomenon in which the operating voltage of the application processor cannot support a desired operating frequency of the application processor.

BRIEF DESCRIPTION OF THE DRAWINGS

The drawings illustrate selected embodiments of the inventive concept. In the drawings, like reference numbers indicate like features.

DETAILED DESCRIPTION

Figure 1:
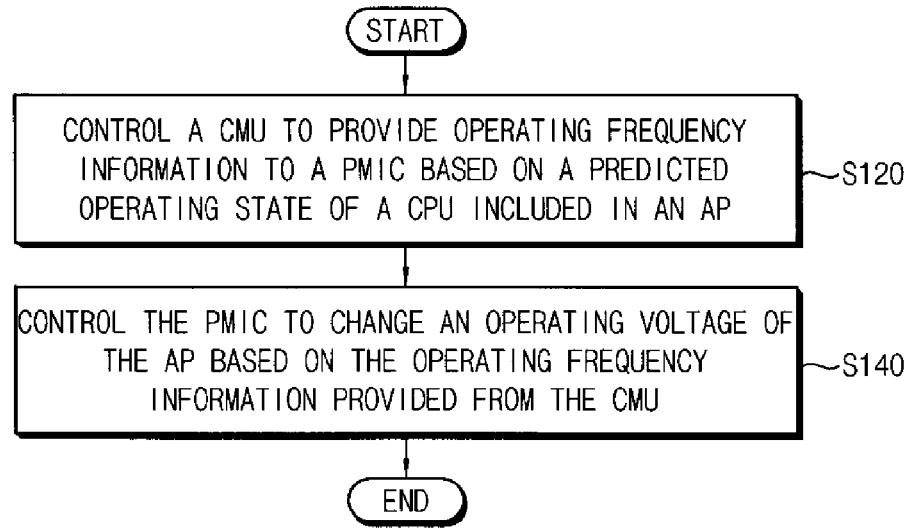
FIG. 1 is a flowchart illustrating a method of performing a DVFS operation according to an embodiment of the inventive concept.

Various embodiments will be described more fully hereinafter with reference to the accompanying drawings, in which some embodiments are shown. The inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the inventive concept. As used herein, the term "and/or" includes any and all combinations of one or more of the associated listed items.

It will be understood that where an element is referred to as being "connected" or "coupled" to another element, it can be directly connected or coupled to the other element or intervening elements may be present. In contrast, where an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the inventive concept. As used herein, the singular forms "a," "an" and "the" are intended to include the plural forms as well, unless the context clearly indicates otherwise. It will be further understood that the terms "comprises" and/or "comprising," where used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
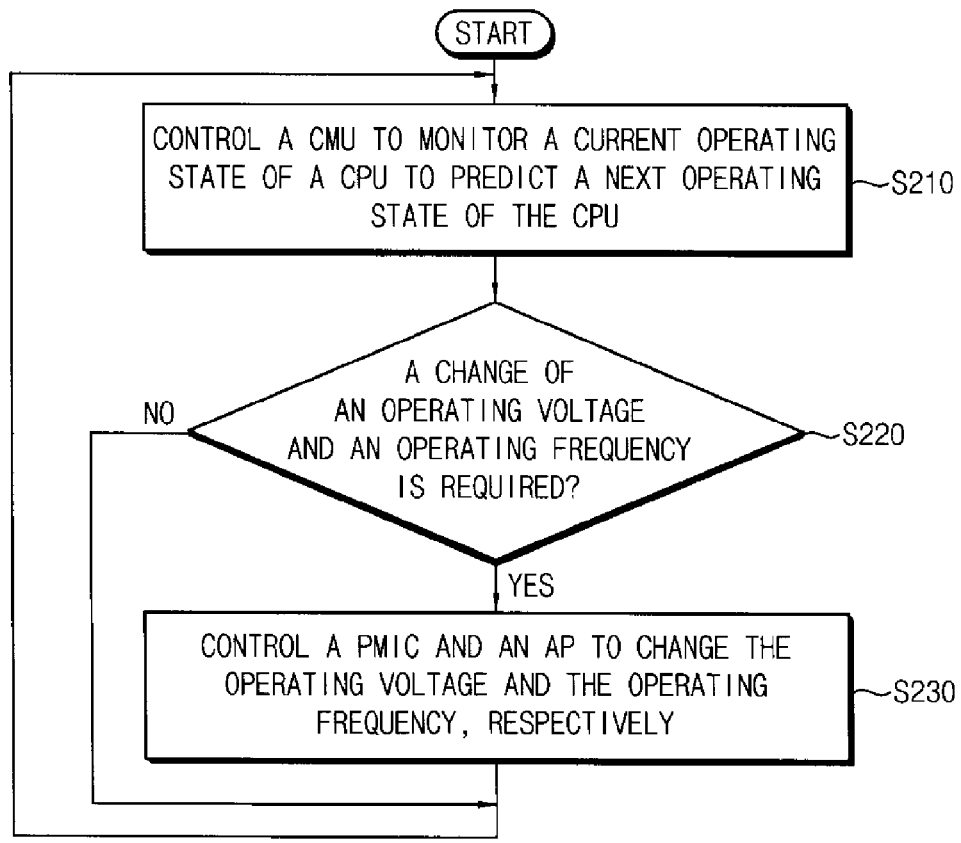
FIG. 2 is a flowchart illustrating a process in which a DVFS operation is performed by the method of FIG. 1.
Figure 3:
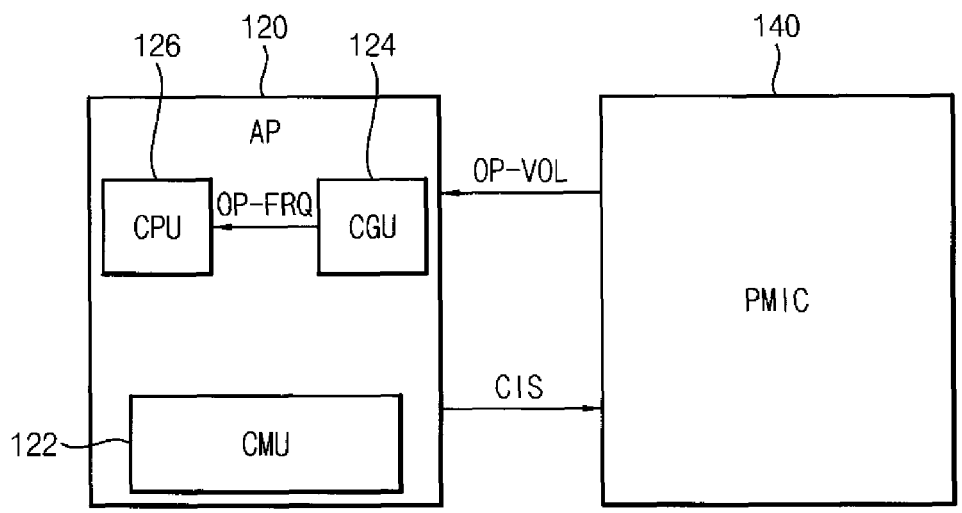
FIG. 3 is a conceptual diagram illustrating a process in which a DVFS operation is performed by the method of FIG. 1.

FIG. 1 is a flowchart illustrating a method of performing a DVFS operation according to an embodiment of the inventive concept. FIG. 2 is a flowchart illustrating a process in which a DVFS operation is performed by the method of FIG. 1. FIG. 3 is a conceptual diagram illustrating a process in which a DVFS operation is performed by the method of FIG. 1. In the description that follows, example method features will be indicated by parentheses (SXXX) to distinguish them from example apparatus features.

Referring to FIGS. 1 through 3, the method of FIG. 1 controls a clock management unit (CMU) 122 to predict an operating state of a CPU 126 in an application processor (AP) 120, and to provide operating frequency information CIS to a PMIC 140 based on the predicted operating state of central processing unit 126 (S120), where the operating frequency information CIS indicates a change of an operating frequency OP-FRQ of application processor 120. Subsequently, the method controls PMIC 140 to change an operating voltage OP-VOL of application processor 120 based on the operating frequency information CIS provided from clock management unit 122 (S140).

An electronic device typically performs a DVFS operation for application processor 120 by dynamically changing operating voltage OP-VOL and operating frequency OP-FRQ of application processor 120 based on a workload of application processor 120 (i.e., a workload of central processing unit 126 in application processor 120). The DVFS operation is performed for application processor 120 by predicting a next operating state (i.e., a future operating state) of central processing unit 126 based on a current operating state of central processing unit 126, and by changing operating voltage OP-VOL and operating frequency OP-FRQ of application processor 120 based on the predicted operating state of central processing unit 126.

An operation for changing operating frequency OP-FRQ of application processor 120 is performed by application processor 120, and an operation for changing operating voltage OP-VOL of application processor 120 is performed by PMIC 140. To perform the DVFS operation for application processor 120 in real-time, the method of FIG. 1 controls interaction between application processor 120 and PMIC 140 in hardware (i.e., not in software such as an operating system (OS)). Thus, the method of FIG. 1 controls clock management unit 122 of application processor 120 to perform interaction between application processor 120 and PMIC 140. As a result, interaction between application processor 120 and PMIC 140 can be performed at high speed, and thus the DVFS operation may be performed for application processor 120 in real-time.

The method of FIG. 1 controls clock management unit 122 to predict the operating state of central processing unit 126, and to provide the operating frequency information CIS to PMIC 140 based on the predicted operating state of central processing unit 126 (S120). As described above, the operating frequency information CIS indicates a change of operating frequency OP-FRQ of application processor 120. In other words, the operating frequency information CIS indicates whether to increase or decrease operating frequency OP-FRQ of application processor 120. Specifically, as illustrated in FIG. 2, the method of FIG. 1 controls clock management unit 122 to monitor a current operating state of central processing unit 126 to predict a next operating state of central processing unit 126 (S210), and to determine whether or not a change of operating voltage OP-VOL and operating frequency OP-FRQ of application processor 120 is required based on the predicted operating state of central processing unit 126 (S220). Here, where clock management unit 122 determines that a change of operating voltage OP-VOL and operating frequency OP-FRQ of application processor 120 is required based on the predicted operating state of central processing unit 126, the method controls clock management unit 122 to provide the operating frequency information CIS indicating that operating frequency OP-FRQ of application processor 120 is to be changed to PMIC 140. As a result, the method of FIG. 1 controls PMIC 140 and application processor 120 to change operating voltage OP-VOL and operating frequency OP-FRQ of application processor 120, respectively (S230). On the other hand, where clock management unit 122 determines that a change of operating voltage OP-VOL and operating frequency OP-FRQ of application processor 120 is not required based on the predicted operating state of central processing unit 126, the method controls clock management unit 122 to monitor a current operating state of central processing unit 126 to predict a next operating state of central processing unit 126 (S210).

As described above, clock management unit 122 provides the operating frequency information CIS indicating that operating frequency OP-FRQ of application processor 120 is to be changed to PMIC 140 where it is determined based on the predicted operating state of central processing unit 126 that a change of operating voltage OP-VOL and operating frequency OP-FRQ of application processor 120 is required. Thus the method of FIG. 1 controls PMIC 140 to change operating voltage OP-VOL of application processor 120 based on the operating frequency information CIS provided from clock management unit 122 (S140). Specifically, the method controls PMIC 140 to increase operating voltage OP-VOL of application processor 120 where the operating frequency information CIS indicates an increase of operating frequency OP-FRQ of application processor 120, i.e., where it indicates that operating frequency OP-FRQ of application processor 120 is to be increased. On the other hand, the method controls PMIC 140 to decrease operating voltage OP-VOL of application processor 120 where the operating frequency information CIS indicates a decrease of operating frequency OP-FRQ of application processor 120, i.e., where it indicates that operating frequency OP-FRQ of application processor 120 is to be decreased. To achieve normal operation of application processor 120, the method controls clock management unit 122 to increase operating frequency OP-FRQ of application processor 120 after controlling PMIC 140 to increase operating voltage OP-VOL of application processor 120 where the operating frequency information CIS indicates that operating frequency OP-FRQ of application processor 120 is to be increased. On the other hand, the method controls clock management unit 122 to decrease operating frequency OP-FRQ of application processor 120 before controlling PMIC 140 to decrease operating voltage OP-VOL of application processor 120 where the operating frequency information CIS indicates that operating frequency OP-FRQ of application processor 120 is to be decreased. These operations will be described below with reference to FIGS. 4 through 7.

Operating frequency OP-FRQ of application processor 120 corresponds to a frequency of a clock signal output from a clock generating unit 124. In addition, the frequency of the clock signal may be determined by clock management unit 122. In some embodiments, clock generating unit 124 comprises a PLL and a frequency divider (i.e., a clock divider). Here, the frequency of the clock signal may be determined such that the frequency divider divides an output frequency of an output signal output from the PLL. For example, to change operating frequency OP-FRQ of application processor 120, the method may change the frequency of the clock signal by controlling clock management unit 122 to control the PLL of clock generating unit 124. Under these circumstances, the method is required to fix operating frequency OP-FRQ of application processor 120 to a predetermined default value because the frequency of the clock signal becomes unstable where clock management unit 122 controls the PLL of clock generating unit 124. For example, to change operating frequency OP-FRQ of application processor 120, the method may change the frequency of the clock signal by controlling clock management unit 122 to control the frequency divider of clock generating unit 124. Under these circumstances, the method of FIG. 1 is not required to fix operating frequency OP-FRQ of application processor 120 to a predetermined default value because operating frequency OP-FRQ of application processor 120 is immediately changed where a divide-ratio of the frequency divider of clock generating unit 124 is changed. For example, to change operating frequency OP-FRQ of application processor 120, the method of FIG. 1 may change the frequency of the clock signal by controlling clock management unit 122 to control both the PLL and the frequency divider of clock generating unit 124. Under these circumstances, the method of FIG. 1 is required to fix operating frequency OP-FRQ of application processor 120 to a predetermined default value because the frequency of the clock signal becomes unstable where clock management unit 122 controls the PLL of clock generating unit 124.

In some other embodiments, clock generating unit 124 comprises multiple PLLs, a multiplexer, and a frequency divider. The frequency of the clock signal can be determined such that the frequency divider divides an output frequency of one output signal selected by the multiplexer among multiple output signals output from the PLLs. For example, to change operating frequency OP-FRQ of application processor 120, the method may change the frequency of the clock signal by controlling clock management unit 122 to control the PLLs of clock generating unit 124. Under these circumstances, the method is required to fix operating frequency OP-FRQ of application processor 120 to a predetermined default value because the frequency of the clock signal becomes unstable where clock management unit 122 controls the PLLs of clock generating unit 124. For example, to change operating frequency OP-FRQ of application processor 120, the method may change the frequency of the clock signal by controlling clock management unit 122 to select one PLL among the PLLs of clock generating unit 124. In another example, to change operating frequency OP-FRQ of application processor 120, the method may change the frequency of the clock signal by controlling clock management unit 122 to control the frequency divider of clock generating unit 124. In yet another example, to change operating frequency OP-FRQ of application processor 120, the method of FIG. 1 may change the frequency of the clock signal by controlling clock management unit 122 to control the frequency divider of clock generating unit 124 as well as to select one PLL among the PLLs of clock generating unit 124.

As described above, the method of FIG. 1 comprises interaction between application processor 120 and PMIC 140 at high speed to predict the operating state of central processing unit 126 in application processor 120. The interaction is used to determine whether to increase or decrease operating frequency OP-FRQ of application processor 120. The method further comprises providing the operating frequency information CIS to PMIC 140, where the operating frequency information CIS is generated based on the predicted operating state of central processing unit 126, and changing operating frequency OP-FRQ of application processor 120 based on the predicted operating state of central processing unit 126 in hardware, i.e., using clock management unit 122. As a result, operating frequency OP-FRQ and operating voltage OP-VOL of application processor 120 may be changed based on the predicted operating state of central processing unit 126 in real-time.

Compared to alternative DVFS techniques in which the operating state of central processing unit 126 is predicted by software such as an operating system, and the interaction between application processor 120 and PMIC 140 is performed by an interface such as an inter-integrated circuit (12C) interface where the operating frequency information CIS is provided from application processor 120 to PMIC 140, the method of FIG. 1 performs the interaction between application processor 120 and PMIC 140 at high speed, and thus may change operating frequency OP-FRQ and operating voltage OP-VOL of application processor 120 based on the predicted operating state of central processing unit 126 in real-time. In some embodiments, clock management unit 122 receives a feedback signal from PMIC 140 to be informed that operating voltage OP-VOL of application processor 120 is changed (e.g., by handshaking). In some embodiments, clock management unit 122 determine that operating voltage OP-VOL of application processor 120 is changed where a predetermined check time elapses after providing the operating frequency information CIS to PMIC 140. However, the inventive concept is not limited to these or other variations described above.

Figure 4:
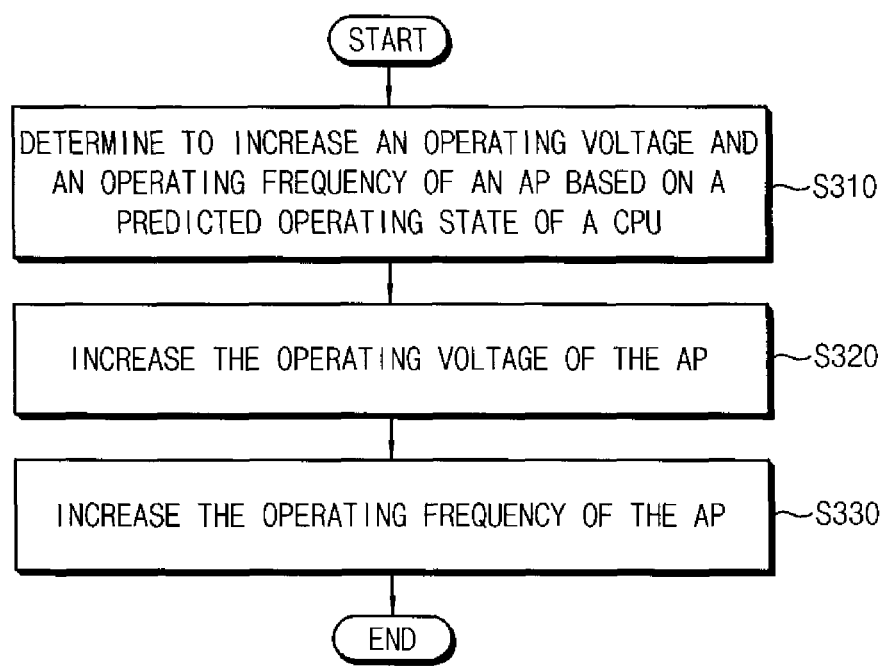
FIG. 4 is a flowchart illustrating a process in which an operating voltage and an operating frequency of an application processor are increased by the method of FIG. 1.
Figure 5:
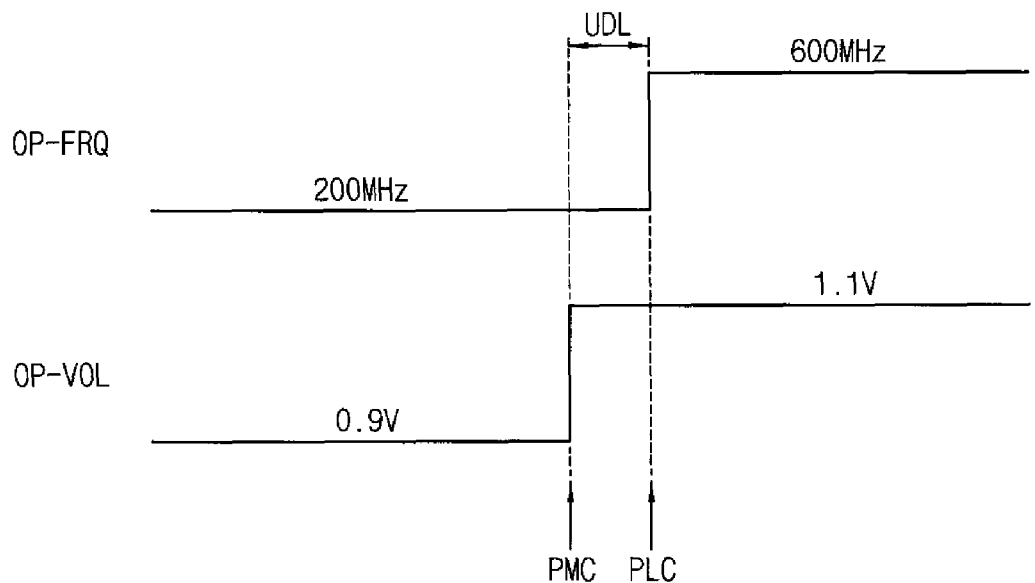
FIG. 5 is a diagram illustrating an example in which an operating voltage and an operating frequency of an application processor are increased by the method of FIG. 1.

FIG. 4 is a flowchart illustrating a process in which an operating voltage and an operating frequency of an application processor are increased by the method of FIG. 1. FIG. 5 is a diagram illustrating an example in which an operating voltage and an operating frequency of an application processor are increased by the method of FIG. 1.

Referring to FIGS. 4 and 5, operating voltage OP-VOL and operating frequency OP-FRQ of application processor 120 are increased by the method of FIG. 1. Specifically, the method of FIG. 1 determines to increase operating voltage OP-VOL and operating frequency OP-FRQ of application processor 120 based on the predicted operating state of central processing unit 126 (S310), increases operating voltage OP-VOL of application processor 120 (S320), and then increases operating frequency OP-FRQ of application processor 120 (S330). For example, as illustrated in FIG. 5, operating voltage OP-VOL of application processor 120 may be increased from 0.9V to 1.1V, and then operating frequency OP-FRQ of application processor 120 may be increased from 200 MHz to 600 MHz after a predetermined time UDL elapses.

Generally, a maximum value of operating frequency OP-FRQ of application processor 120 depends on operating voltage OP-VOL of application processor 120. That is, where operating voltage OP-VOL of application processor 120 is decreased, a maximum value to which operating frequency OP-FRQ of application processor 120 can be increased may be decreased. Thus, if operating voltage OP-VOL and operating frequency OP-FRQ of application processor 120 are increased at the same time, or if operating frequency OP-FRQ of application processor 120 is increased prior to operating voltage OP-VOL of application processor 120, a phenomenon in which operating voltage OP-VOL of application processor 120 cannot support operating frequency OP-FRQ of application processor 120 may occur because operating frequency OP-FRQ of application processor 120 may be relatively high in consideration of operating voltage OP-VOL of application processor 120. Under these circumstances, a DVFS operation may not be properly performed for application processor 120. Thus, when increasing operating voltage OP-VOL and operating frequency OP-FRQ of application processor 120, the method of FIG. 1 controls PMIC 140 to increase operating voltage OP-VOL of application processor 120 to a specific level that supports a desired operating frequency of application processor 120, and then controls clock management unit 122 to increase operating frequency OP-FRQ of application processor 120. As a result, the method of FIG. 1 may prevent unnecessary power consumption resulting from a phenomenon in which operating voltage OP-VOL of application processor 120 is unnecessarily high compared to operating frequency OP-FRQ of application processor 120, and it may also prevent a malfunction resulting from a phenomenon in which operating voltage OP-VOL of application processor 120 cannot support a desired operating frequency of application processor 120.

As illustrated in FIG. 5, PMIC 140 increases operating voltage OP-VOL of application processor 120 in response to a power control signal PMC. Here, power control signal PMC may be generated based on the operating frequency information CIS provided from clock management unit 122. Subsequently, clock management unit 122 may increase operating frequency OP-FRQ of application processor 120 in response to a clock control signal PLC. Here, clock control signal PLC is generated based on a predicted operating state of central processing unit 126. Clock control signal PLC may be generated where a predetermined time UDL elapses after power control signal PMC.

Clock control signal PLC comprises a first clock control signal that controls a frequency divider of clock generating unit 124, a second clock control signal that controls a PLL of clock generating unit 124, and/or a third clock control signal that controls a multiplexer of clock generating unit 124. For example, where clock generating unit 124 comprises a PLL and a frequency divider, operating frequency OP-FRQ of application processor 120 may be changed by controlling the frequency divider of clock generating unit 124, by controlling the PLL of clock generating unit 124, or by controlling both the frequency divider and the PLL of clock generating unit 124. In this example, clock control signal PLC may include the first clock control signal and the second clock control signal. As another example, where clock generating unit 124 comprises multiple PLLs, a frequency divider, and a multiplexer, operating frequency OP-FRQ of application processor 120 may be changed by controlling the frequency divider of clock generating unit 124, by selecting one PLL among the PLLs of clock generating unit 124, or by selecting one PLL among the PLLs of clock generating unit 124 as well as controlling the frequency divider of clock generating unit 124. In this example, clock control signal PLC may include the first clock control signal, the second clock control signal, and the third clock control signal.

As described above, when increasing operating voltage OP-VOL and operating frequency OP-FRQ of application processor 120 based on a predicted operating state of central processing unit 126, the method of FIG. 1 controls PMIC 140 to increase operating voltage OP-VOL of application processor 120, and then controls clock management unit 122 to increase operating frequency OP-FRQ of application processor 120 where the predetermined time UDL elapses after operating voltage OP-VOL of application processor 120 is increased. Here, the predetermined time UDL may be set to be longer than a time necessary for PMIC 140 to increase operating voltage OP-VOL of application processor 120. In some embodiments, clock management unit 122 receives a feedback signal from PMIC 140 to be informed that operating voltage OP-VOL of application processor 120 is changed. In some embodiments, clock management unit 122 determines that operating voltage OP-VOL of application processor 120 is changed where a predetermined check time elapses after providing the operating frequency information CIS to PMIC 140. However, the inventive concept is not limited thereto.

As described above, when increasing operating voltage OP-VOL and operating frequency OP-FRQ of application processor 120, the method of FIG. 1 may prevent unnecessary power consumption resulting from a phenomenon in which operating voltage OP-VOL of application processor 120 is unnecessarily high compared to operating frequency OP-FRQ, and may prevent a malfunction resulting from a phenomenon in which operating voltage OP-VOL of application processor 120 cannot support a desired operating frequency of application processor 120.

Figure 6:
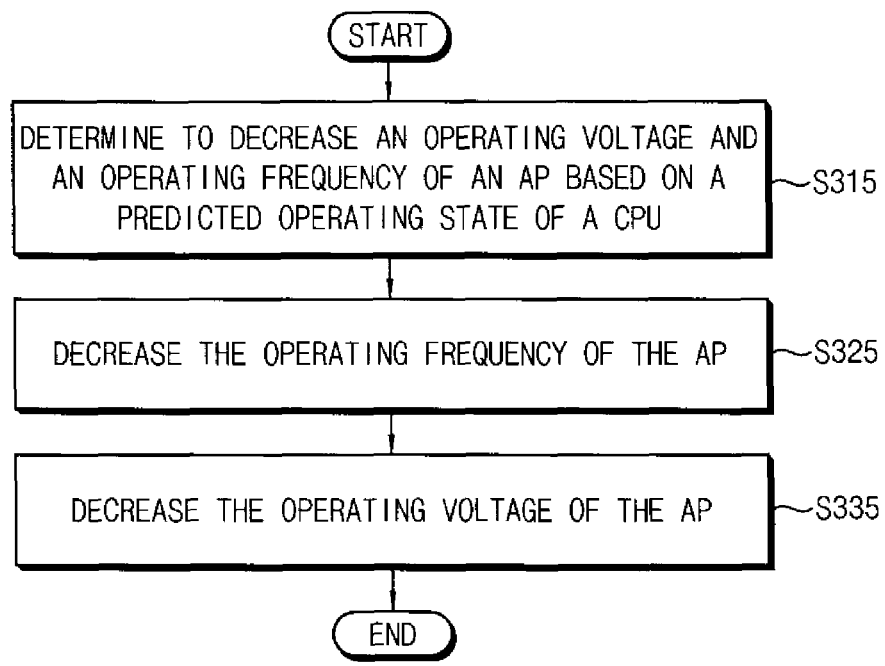
FIG. 6 is a flowchart illustrating a process in which an operating voltage and an operating frequency of an application processor are decreased by the method of FIG. 1.
Figure 7:
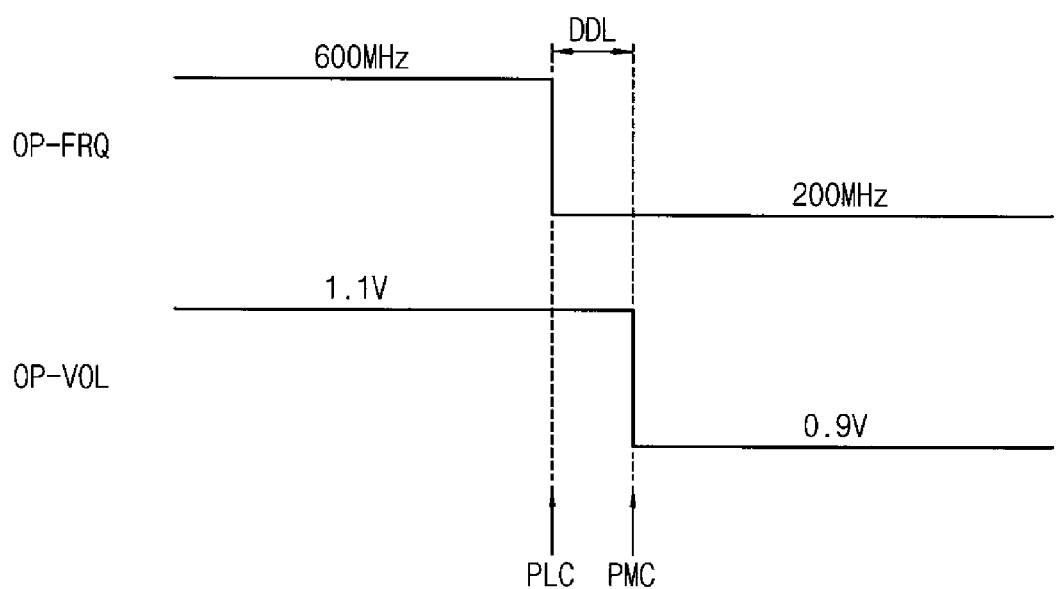
FIG. 7 is a diagram illustrating an example in which an operating voltage and an operating frequency of an application processor are decreased by the method of FIG. 1.

FIG. 6 is a flowchart illustrating a process in which an operating voltage and an operating frequency of an application processor are decreased by the method of FIG. 1. FIG. 7 is a diagram illustrating an example in which an operating voltage and an operating frequency of an application processor are decreased by the method of FIG. 1.

Referring to FIGS. 6 and 7, operating voltage OP-VOL and operating frequency OP-FRQ of application processor 120 are decreased by the method of FIG. 1. Specifically, the method of FIG. 1 determines to decrease operating voltage OP-VOL and operating frequency OP-FRQ of application processor 120 based on a predicted operating state of central processing unit 126 (S315), decreases operating frequency OP-FRQ of application processor 120 (S325), and then decreases operating voltage OP-VOL of application processor 120 (S335). For example, as illustrated in FIG. 7, operating frequency OP-FRQ of application processor 120 may be decreased from 600 MHz to 200 MHz, and then operating voltage OP-VOL of application processor 120 may be decreased from 1.1V to 0.9V after a predetermined time DDL elapses.

Generally, a maximum value of operating frequency OP-FRQ of application processor 120 depends on operating voltage OP-VOL of application processor 120. That is, where operating voltage OP-VOL of application processor 120 is decreased, a maximum value to which operating frequency OP-FRQ of application processor 120 can be increased may be decreased. Thus, if operating voltage OP-VOL and operating frequency OP-FRQ of application processor 120 are decreased at the same time, or if operating voltage OP-VOL of application processor 120 is decreased prior to operating frequency OP-FRQ of application processor 120, a phenomenon in which operating voltage OP-VOL of application processor 120 cannot support operating frequency OP-FRQ of application processor 120 may occur because operating voltage OP-VOL of application processor 120 may be relatively low compared to operating frequency OP-FRQ of application processor 120. Under these circumstances, a DVFS operation may not be properly performed for application processor 120. Thus, when decreasing operating voltage OP-VOL and operating frequency OP-FRQ of application processor 120, the method of FIG. 1 controls clock management unit 122 to decrease operating frequency OP-FRQ of application processor 120 to a desired operating frequency, and then controls PMIC 140 to decrease operating voltage OP-VOL of application processor 120. As a result, the method of FIG. 1 may prevent unnecessary power consumption resulting from a phenomenon in which operating voltage OP-VOL of application processor 120 is unnecessarily high compared to operating frequency OP-FRQ of application processor 120 (i.e., a large leakage current occurs), and may prevent a malfunction resulting from a phenomenon in which operating voltage OP-VOL of application processor 120 cannot support a desired operating frequency of application processor 120.

As illustrated in FIG. 7, clock management unit 122 decreases operating frequency OP-FRQ of application processor 120 in response to a clock control signal PLC. Here, clock control signal PLC is generated based on a predicted operating state of central processing unit 126.

As described above, clock control signal PLC may comprise a first clock control signal that controls a frequency divider of clock generating unit 124, a second clock control signal that controls a PLL of clock generating unit 124, and/or a third clock control signal that controls a multiplexer of clock generating unit 124. For example, where clock generating unit 124 comprises a PLL and a frequency divider, operating frequency OP-FRQ of application processor 120 may be changed by controlling the frequency divider of clock generating unit 124, by controlling the PLL of clock generating unit 124, or by controlling both the frequency divider and the PLL of clock generating unit 124. Under these circumstances, clock control signal PLC may include the first clock control signal and the second clock control signal.

In addition, where clock generating unit 124 comprises multiple PLLs, a frequency divider, and a multiplexer, operating frequency OP-FRQ of application processor 120 may be changed by controlling the frequency divider of clock generating unit 124, by selecting one PLL among the PLLs of clock generating unit 124, or by selecting one PLL among the PLLs of clock generating unit 124 as well as controlling the frequency divider of clock generating unit 124. That is, clock control signal PLC may include the first clock control signal, the second clock control signal, and the third clock control signal.

Subsequently, PMIC 140 decreases operating voltage OP-VOL of application processor 120 in response to a power control signal PMC. Here, power control signal PMC may be generated based on the operating frequency information CIS provided from clock management unit 122. As illustrated in FIG. 7, power control signal PMC is generated where the predetermined time DDL elapses after clock control signal PLC.

As described above, when decreasing operating voltage OP-VOL and operating frequency OP-FRQ of application processor 120 based on a predicted operating state of central processing unit 126, the method of FIG. 1 controls clock management unit 122 to decrease operating frequency OP-FRQ of application processor 120, and then controls PMIC 140 to decrease operating voltage OP-VOL of application processor 120 where the predetermined time DDL elapses after operating frequency OP-FRQ of application processor 120 is decreased. Here, the predetermined time DDL is set to be longer than a time necessary for clock management unit 122 to decrease operating frequency OP-FRQ of application processor 120.

In some embodiments, clock management unit 122 receives a feedback signal from PMIC 140 to be informed that operating voltage OP-VOL of application processor 120 is changed. In some embodiments, clock management unit 122 determines that operating voltage OP-VOL of application processor 120 is changed where a predetermined check time elapses after providing the operating frequency information CIS to PMIC 140. However, the inventive concept is not limited thereto. As described above, when decreasing operating voltage OP-VOL and operating frequency OP-FRQ of application processor 120, the method of FIG. 1 may prevent unnecessary power consumption resulting from a phenomenon in which operating voltage OP-VOL of application processor 120 is unnecessarily high compared to operating frequency OP-FRQ, and it may prevent a malfunction resulting from a phenomenon in which operating voltage OP-VOL of application processor 120 cannot support a desired operating frequency of application processor 120.

Figure 8:
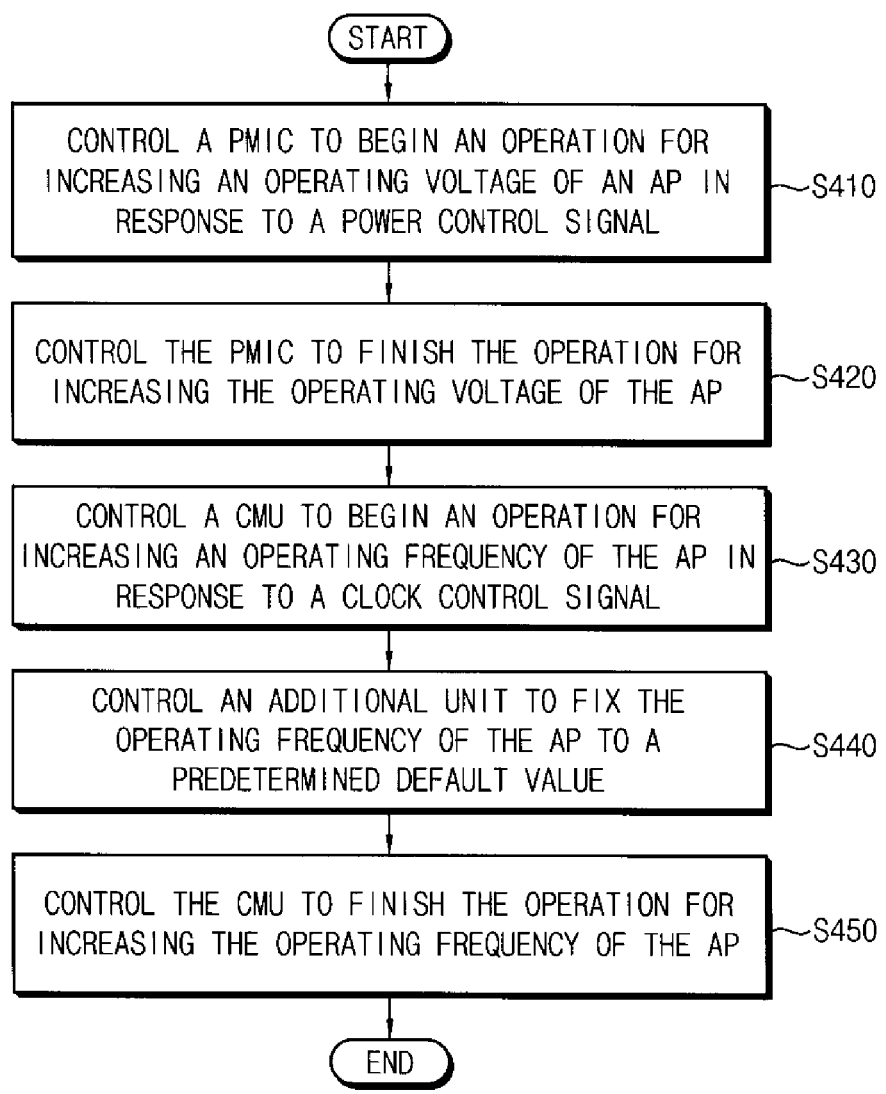
FIG. 8 is a flowchart illustrating an example in which the method of FIG. 1 increases an operating frequency of an application processor by controlling a phase locked loop (PLL) of a clock generating unit.
Figure 9:
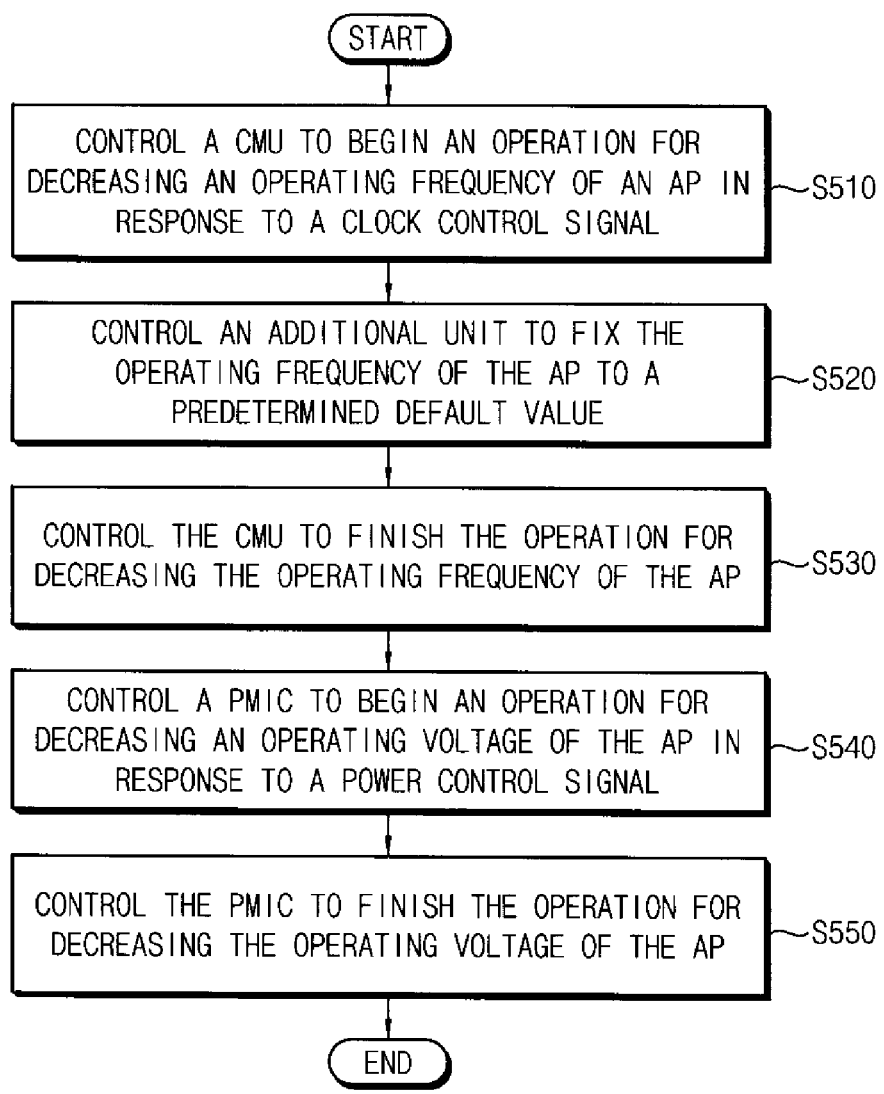
FIG. 9 is a flowchart illustrating an example in which the method of FIG. 1 decreases an operating frequency of an application processor by controlling a PLL of a clock generating unit.
Figure 10:
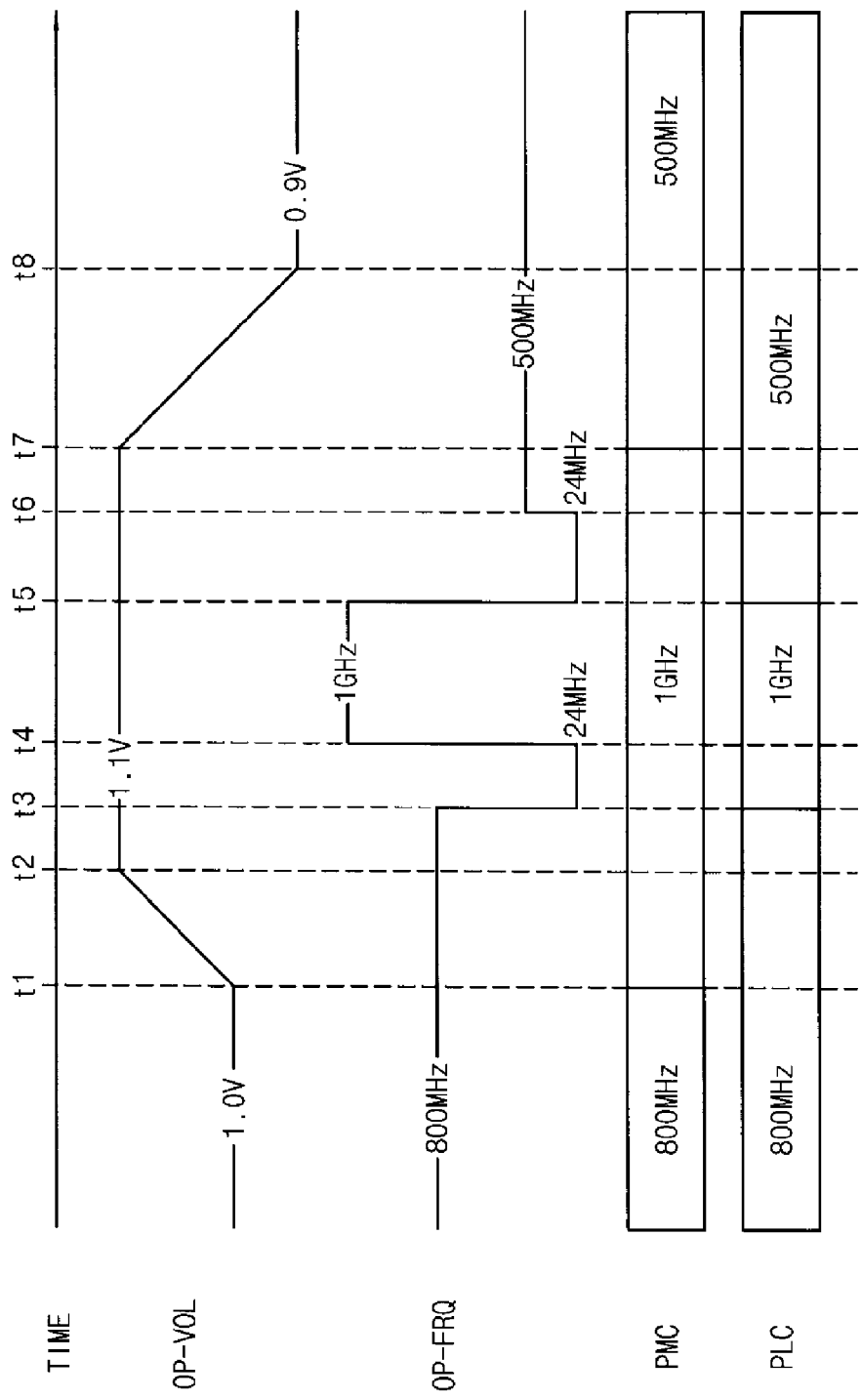
FIG. 10 is a timing diagram illustrating an example in which the method of FIG. 1 performs a DVFS operation for an application processor by controlling a PLL of a clock generating unit.

FIG. 8 is a flowchart illustrating an example in which the method of FIG. 1 increases an operating frequency of an application processor by controlling a PLL of a clock generating unit. FIG. 9 is a flowchart illustrating an example in which the method of FIG. 1 decreases an operating frequency of an application processor by controlling a PLL of a clock generating unit. FIG. 10 is a timing diagram illustrating an example in which the method of FIG. 1 performs a DVFS operation for an application processor by controlling a PLL of a clock generating unit.

Referring to FIGS. 8 through 10, application processor 120 operates at operating voltage OP-VOL of 1V and operating frequency OP-FRQ of 800 MHz. Subsequently, application processor 120 operates at operating voltage OP-VOL of 1.1V and operating frequency OP-FRQ of 1 GHz in consideration of an operating state of central processing unit 126. Next, application processor 120 operates at operating voltage OP-VOL of 0.9V and operating frequency OP-FRQ of 500 MHz in consideration of an operating state of central processing unit 126. It is assumed in FIGS. 8 through 10 that a frequency divider of clock generating unit 124 operates based on a divide-ratio of 1. In other words, operating frequency OP-FRQ of application processor 120 may be adjusted only by controlling a PLL of clock generating unit 124.

Referring to FIGS. 8 through 10, PMIC 140 begins an operation for increasing operating voltage OP-VOL of application processor 120 in response to power control signal PMC (S410), and then it finishes the operation for increasing operating voltage OP-VOL of application processor 120 (S420) after performing the operation for increasing operating voltage OP-VOL of application processor 120 during a predetermined time. Here, PMIC 140 generates power control signal PMC based on the operating frequency information CIS. Specifically, PMIC 140 may increase operating voltage OP-VOL of application processor 120 from 1V to 1.1V in response to power control signal PMC where the operating frequency information CIS indicates an increase of operating frequency OP-FRQ of application processor 120 (i.e., from 800 MHz to 1 GHz). As illustrated in FIG. 10, in response to power control signal PMC, PMIC 140 increases operating voltage OP-VOL of application processor 120 from 1V to 1.1V during a period between a first time t1 to a second time t2. In some embodiments, clock management unit 122 receives a feedback signal from PMIC 140 to be informed that operating voltage OP-VOL of application processor 120 is increased from 1V to 1.1V. In some embodiments, clock management unit 122 determines that operating voltage OP-VOL of application processor 120 is increased from 1V to 1.1V where a predetermined check time elapses after providing the operating frequency information CIS to PMIC 140.

Next, clock management unit 122 begins an operation for increasing operating frequency OP-FRQ of application processor 120 in response to clock control signal PLC (S430), and then it finishes the operation for increasing operating frequency OP-FRQ of application processor 120 (S450) after performing the operation for increasing operating frequency OP-FRQ of application processor 120 during a predetermined time. Here, clock management unit 122 generates clock control signal PLC based on a predicted operating state of central processing unit 126. As described above, operating frequency OP-FRQ of application processor 120 may be increased after operating voltage OP-VOL of application processor 120 is increased. Thus, clock control signal PLC may be generated where a predetermined time elapses after power control signal PMC.

Meanwhile, because clock management unit 122 increases operating frequency OP-FRQ of application processor 120 by controlling the PLL of clock generating unit 124, the PLL of clock generating unit 124 may not output a stable output signal while operating frequency OP-FRQ of application processor 120 is increased. As a result, the clock signal output from clock generating unit 124 may also be unstable. Thus, an additional unit fixes operating frequency OP-FRQ of application processor 120 to a predetermined default value (S440) while operating frequency OP-FRQ of application processor 120 is increased. That is, a clock signal having a frequency corresponding to the predetermined default value is input to central processing unit 126 of application processor 120. Clock management unit 122 increases operating frequency OP-FRQ of application processor 120 from 800 MHz to 1 GHz during a period between a third time t3 to a fourth time t4, where the third time t3 is the time where a predetermined time elapses after the second time t2, and it fixes operating frequency OP-FRQ of application processor 120 to the predetermined default value of 24 MHz during the period between the third time t3 and the fourth time t4.

Referring to FIGS. 9 and 10, clock management unit 122 begins an operation for decreasing operating frequency OP-FRQ of application processor 120 in response to clock control signal PLC (S510), and then finishes the operation for decreasing operating frequency OP-FRQ of application processor 120 (S530) after performing the operation for decreasing operating frequency OP-FRQ of application processor 120 during a predetermined time. Here, clock management unit 122 generates clock control signal PLC based on a predicted operating state of central processing unit 126.

As described above, operating voltage OP-VOL of application processor 120 may be decreased after operating frequency OP-FRQ of application processor 120 is decreased. Thus, power control signal PMC may be generated where a predetermined time elapses after clock control signal PLC. Meanwhile, because clock management unit 122 decreases operating frequency OP-FRQ of application processor 120 by controlling the PLL of clock generating unit 124, the PLL of clock generating unit 124 may not output a stable output signal while operating frequency OP-FRQ of application processor 120 is decreased. As a result, the clock signal output from clock generating unit 124 may also be unstable. Thus, an additional unit may fix operating frequency OP-FRQ of application processor 120 to the predetermined default value (S520) while operating frequency OP-FRQ of application processor 120 is decreased. That is, a clock signal having a frequency corresponding to the predetermined default value may be input to central processing unit 126 of application processor 120.

Clock management unit 122 decreases operating frequency OP-FRQ of application processor 120 from 1 GHz to 500 MHz during a period between a fifth time t5 to a sixth time t6, and it fixes operating frequency OP-FRQ of application processor 120 to the predetermined default value of 24 MHz during the period between the fifth time t5 and the sixth time t6.

Next, PMIC 140 begins an operation for decreasing operating voltage OP-VOL of application processor 120 in response to power control signal PMC (S540), and then finishes the operation for decreasing operating voltage OP-VOL of application processor 120 (S550) after performing the operation for decreasing operating voltage OP-VOL of application processor 120 during a predetermined time. Here, PMIC 140 generates power control signal PMC based on the operating frequency information CIS. Specifically, PMIC 140 decreases operating voltage OP-VOL of application processor 120 from 1.1V to 0.9V in response to power control signal PMC where the operating frequency information CIS indicates a decrease of operating frequency OP-FRQ of application processor 120 (i.e., from 1 GHz to 500 MHz).

As illustrated in FIG. 10, in response to power control signal PMC, PMIC 140 decreases operating voltage OP-VOL of application processor 120 from 1.1V to 0.9V during a period between a seventh time t7 to a eighth time t8, where the seventh time t7 is the time where a predetermined time elapses after the sixth time t6. In some embodiments, clock management unit 122 receives a feedback signal from PMIC 140 to be informed that operating voltage OP-VOL of application processor 120 is decreased from 1.1V to 0.9V. In some embodiments, clock management unit 122 may determine that operating voltage OP-VOL of application processor 120 is decreased from 1.1V to 0.9V where a predetermined check time elapses after providing the operating frequency information CIS to PMIC 140.

Figure 11:
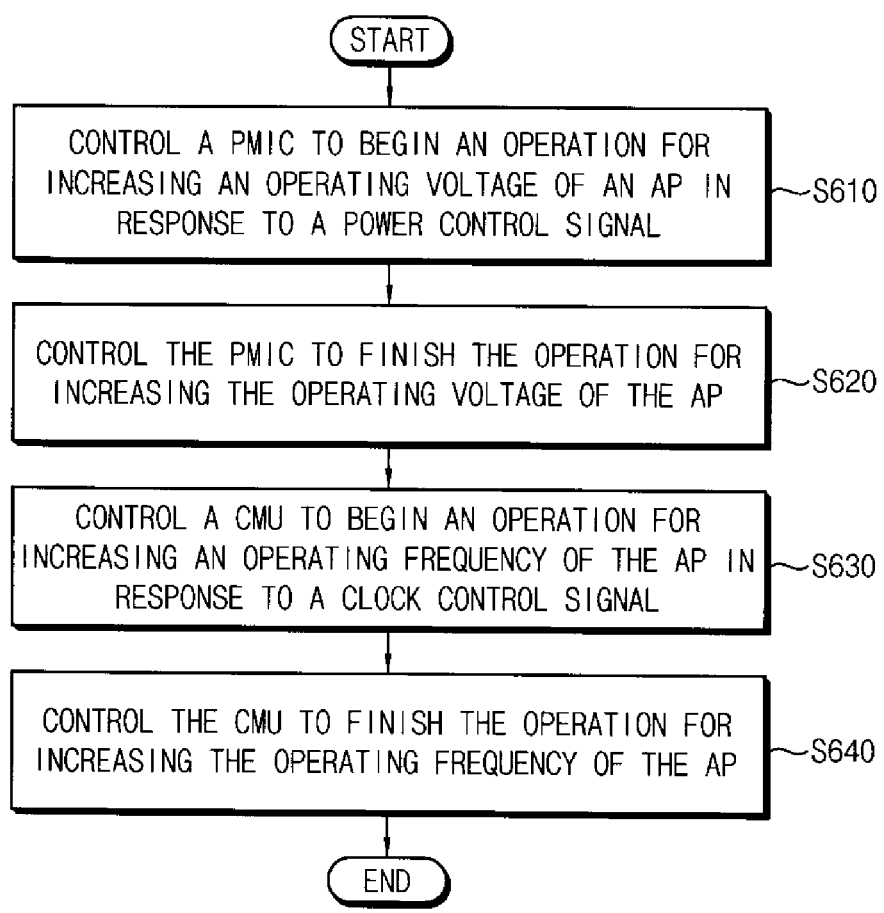
FIG. 11 is a flowchart illustrating an example in which the method of FIG. 1 increases an operating frequency of an application processor by controlling a frequency divider of a clock generating unit.
Figure 12:
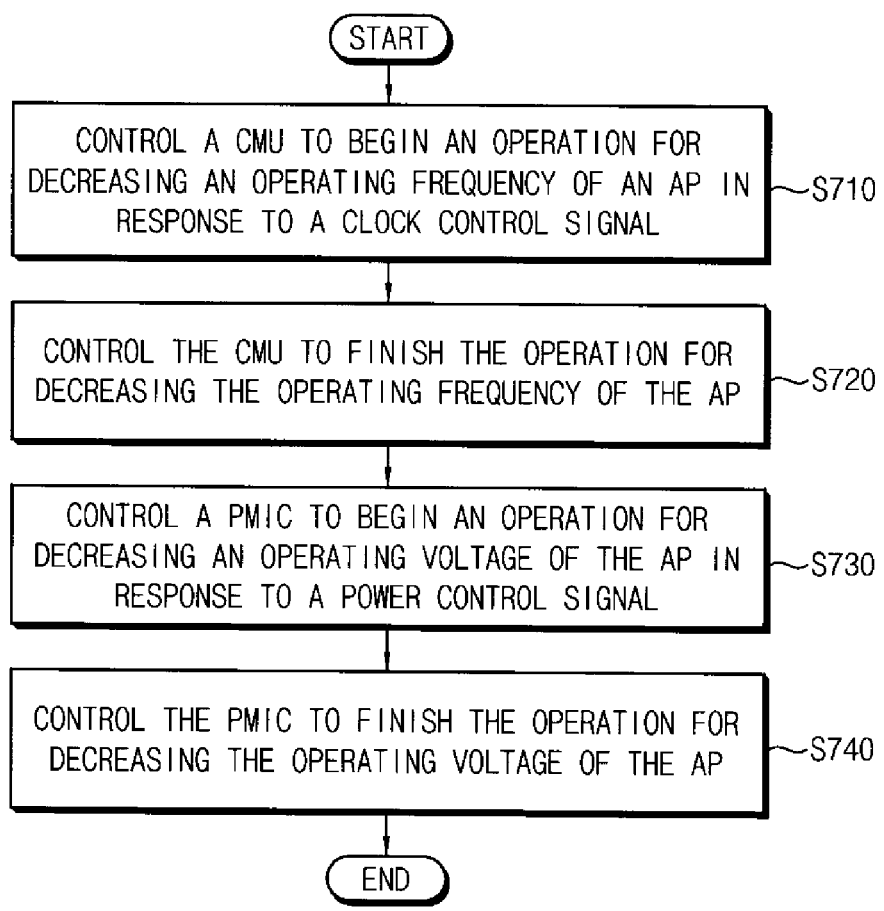
FIG. 12 is a flowchart illustrating an example in which the method of FIG. 1 decreases an operating frequency of an application processor by controlling a frequency divider of a clock generating unit.
Figure 13:
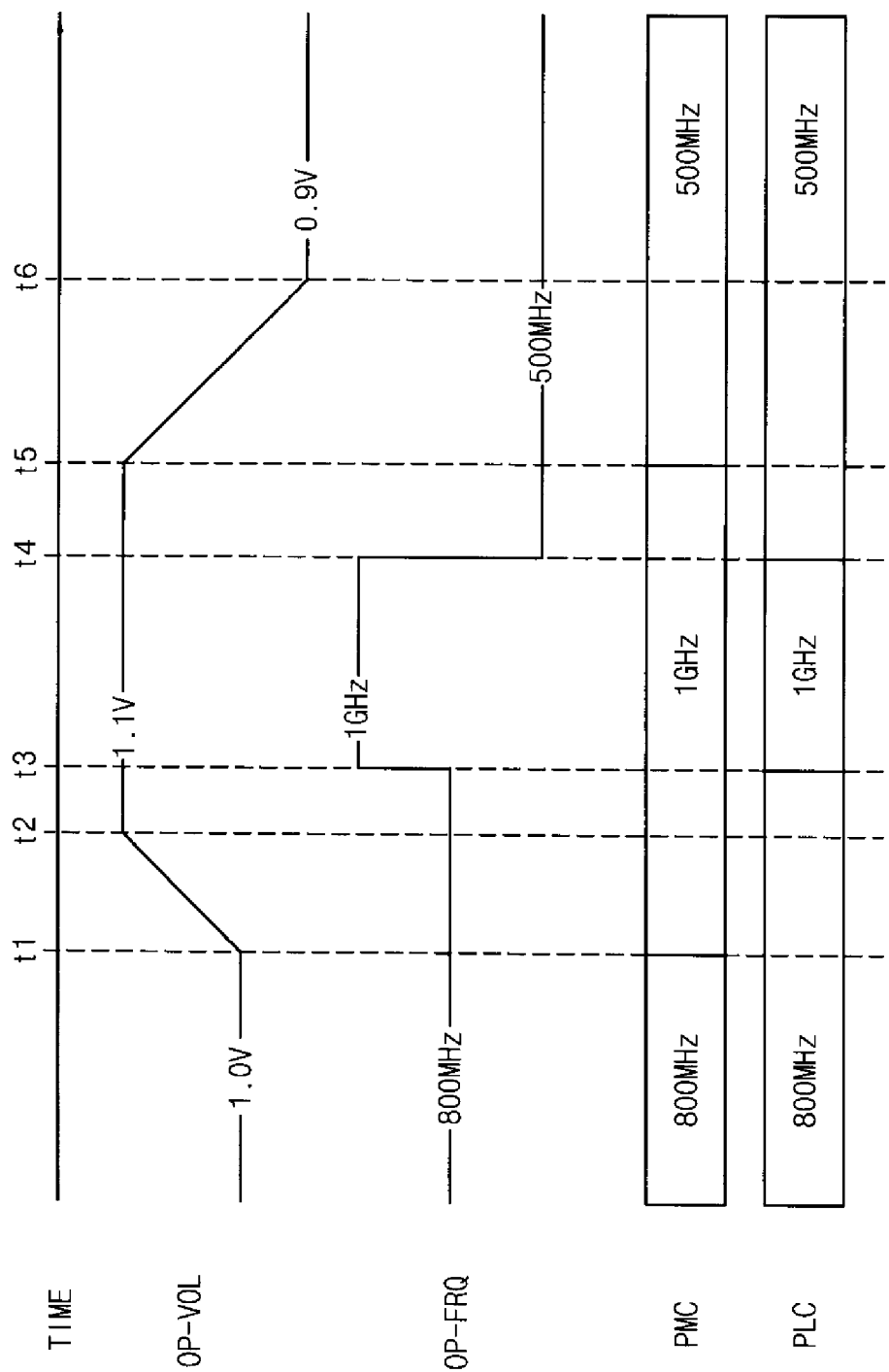
FIG. 13 is a timing diagram illustrating an example in which the method of FIG. 1 performs a DVFS operation for an application processor by controlling a frequency divider of a clock generating unit.

FIG. 11 is a flowchart illustrating an example in which the method of FIG. 1 increases an operating frequency of an application processor by controlling a frequency divider of a clock generating unit. FIG. 12 is a flowchart illustrating an example in which the method of FIG. 1 decreases an operating frequency of an application processor by controlling a frequency divider of a clock generating unit. FIG. 13 is a timing diagram illustrating an example in which the method of FIG. 1 performs a DVFS operation for an application processor by controlling a frequency divider of a clock generating unit.

Referring to FIGS. 11 through 13, application processor 120 operates at operating voltage OP-VOL of 1V and operating frequency OP-FRQ of 800 MHz. Subsequently, application processor 120 operates at operating voltage OP-VOL of 1.1V and operating frequency OP-FRQ of 1 GHz in consideration of an operating state of central processing unit 126. Next, application processor 120 may operate at operating voltage OP-VOL of 0.9V and operating frequency OP-FRQ of 500 MHz in consideration of an operating state of central processing unit 126. It is assumed in FIGS. 11 through 13 that an output frequency of an output signal output from a PLL of clock generating unit 124 is not changed. In other words, operating frequency OP-FRQ of application processor 120 may be adjusted only by controlling a frequency divider of clock generating unit 124.

Referring to FIGS. 11 through 13, PMIC 140 begins an operation for increasing operating voltage OP-VOL of application processor 120 in response to power control signal PMC (S610), and then finishes the operation for increasing operating voltage OP-VOL of application processor 120 (S620) after performing the operation for increasing operating voltage OP-VOL of application processor 120 during a predetermined time. Here, PMIC 140 generates power control signal PMC based on the operating frequency information CIS. Specifically, PMIC 140 increases operating voltage OP-VOL of application processor 120 from 1V to 1.1V in response to power control signal PMC where the operating frequency information CIS indicates an increase of operating frequency OP-FRQ of application processor 120 (i.e., from 800 MHz to 1 GHz).

As illustrated in FIG. 13, PMIC 140 begins the operation for increasing operating voltage OP-VOL of application processor 120 at a first time t1, and then finishes the operation for increasing operating voltage OP-VOL of application processor 120 at a second time t2. That is, in response to power control signal PMC, PMIC 140 increases operating voltage OP-VOL of application processor 120 from 1V to 1.1V during a period between the first time t1 to the second time t2. In some embodiments, clock management unit 122 receives a feedback signal from PMIC 140 to be informed that operating voltage OP-VOL of application processor 120 is increased from 1V to 1.1V. In some embodiments, clock management unit 122 determines that operating voltage OP-VOL of application processor 120 is increased from 1V to 1.1V where a predetermined check time elapses after providing the operating frequency information CIS to PMIC 140.

Next, clock management unit 122 begins an operation for increasing operating frequency OP-FRQ of application processor 120 in response to clock control signal PLC (S630), and then finishes the operation for increasing operating frequency OP-FRQ of application processor 120 (S640). Here, clock management unit 122 generates clock control signal PLC based on a predicted operating state of central processing unit 126.

As described above, operating frequency OP-FRQ of application processor 120 is increased after operating voltage OP-VOL of application processor 120 is increased. Thus, clock control signal PLC is generated where a predetermined time elapses after power control signal PMC. Specifically, clock management unit 122 may increase operating frequency OP-FRQ of application processor 120 from 800 MHz to 1 GHz in response to clock control signal PLC.

As illustrated in FIG. 13, because clock management unit 122 increases operating frequency OP-FRQ of application processor 120 by controlling the frequency divider of clock generating unit 124, clock management unit 122 immediately changes operating frequency OP-FRQ of application processor 120 by changing a divide-ratio of the frequency divider of clock generating unit 124. Hence, unlike FIGS. 8 through 10, operating frequency OP-FRQ of application processor 120 is not fixed to a predetermined default value. As a result, clock management unit 122 may immediately increase operating frequency OP-FRQ of application processor 120 from 800 MHz to 1 GHz at a third time t3, where the third time t3 is the time where a predetermined time elapses after the second time t2.

Referring to FIGS. 12 and 13, clock management unit 122 begins an operation for decreasing operating frequency OP-FRQ of application processor 120 in response to clock control signal PLC (S710), and then finishes the operation for decreasing operating frequency OP-FRQ of application processor 120 (S720). Here, clock management unit 122 generates clock control signal PLC based on a predicted operating state of central processing unit 126. Specifically, clock management unit 122 decreases operating frequency OP-FRQ of application processor 120 from 1 GHz to 500 MHz in response to clock control signal PLC.

As illustrated in FIG. 13, because clock management unit 122 decreases operating frequency OP-FRQ of application processor 120 by controlling the frequency divider of clock generating unit 124, clock management unit 122 immediately changes operating frequency OP-FRQ of application processor 120 by changing a divide-ratio of the frequency divider of clock generating unit 124. Hence, unlike the examples in FIGS. 8 through 10, operating frequency OP-FRQ of application processor 120 is not fixed to a predetermined default value. As a result, clock management unit 122 may maintain operating frequency OP-FRQ of application processor 120 to be 1 GHz during a period between a third time t3 and a fourth time t4, and may immediately decrease operating frequency OP-FRQ of application processor 120 from 1 GHz to 500 MHz at the fourth time t4.

Next, PMIC 140 begins an operation for decreasing operating voltage OP-VOL of application processor 120 in response to power control signal PMC (S730), and then it finishes the operation for decreasing operating voltage OP-VOL of application processor 120 (S740) after performing the operation for decreasing operating voltage OP-VOL of application processor 120 during a predetermined time. Here, PMIC 140 generates power control signal PMC based on the operating frequency information CIS. As described above, operating voltage OP-VOL of application processor 120 is decreased after operating frequency OP-FRQ of application processor 120 is decreased. Thus, power control signal PMC is generated where a predetermined time elapses after clock control signal PLC. Specifically, PMIC 140 decreases operating voltage OP-VOL of application processor 120 from 1.1V to 0.9V in response to power control signal PMC where the operating frequency information CIS indicates a decrease of operating frequency OP-FRQ of application processor 120 (i.e., from 1 GHz to 500 MHz).

As illustrated in FIG. 13, PMIC 140 begins the operation for decreasing operating voltage OP-VOL of application processor 120 at a fifth time t5, and then finishes the operation for decreasing operating voltage OP-VOL of application processor 120 at a sixth time t6. That is, PMIC 140 decreases operating voltage OP-VOL of application processor 120 from 1.1V to 0.9V during a period between the fifth time t5 and the sixth time t6 in response to power control signal PMC. In some embodiments, clock management unit 122 receives a feedback signal from PMIC 140 to be informed that operating voltage OP-VOL of application processor 120 is decreased from 1.1V to 0.9V. In some embodiments, clock management unit 122 determines that operating voltage OP-VOL of application processor 120 is decreased from 1.1V to 0.9V where a predetermined check time elapses after providing the operating frequency information CIS to PMIC 140.

Figure 14:
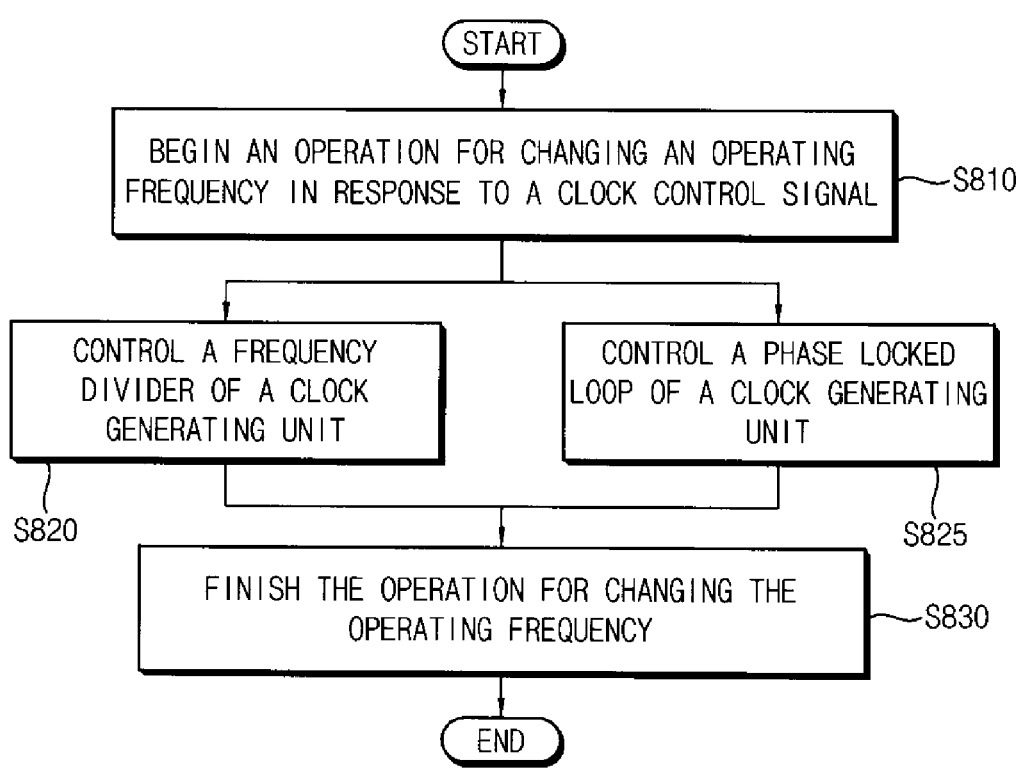
FIG. 14 is a flowchart illustrating an example in which the method of FIG. 1 changes an operating frequency of an application processor by controlling a frequency divider and a PLL of a clock generating unit.

FIG. 14 is a flowchart illustrating an example in which the method of FIG. 1 changes an operating frequency of an application processor by controlling a frequency divider and a PLL of a clock generating unit.

Referring to FIG. 14, using the method of FIG. 1, clock management unit 122 begins an operation for changing operating frequency OP-FRQ of application processor 120 in response to clock control signal PLC (S810), where clock control signal PLC is generated based on a predicted operating state of central processing unit 126, controls a frequency divider of clock generating unit 124 (S820) and/or a PLL of clock generating unit 124 (S825), and then finishes the operation for changing operating frequency OP-FRQ of application processor 120 (S830).

As described above, a clock signal output from clock generating unit 124 is input to central processing unit 126, and central processing unit 126 operates based on the clock signal. That is, a frequency of the clock signal corresponds to operating frequency OP-FRQ of application processor 120. Specifically, clock generating unit 124 comprises a frequency divider and a PLL. Here, an output signal output from the PLL may pass through the frequency divider to be the clock signal. Thus, the frequency of the clock signal may be determined such that the frequency of the output signal is divided by the frequency divider.

In addition, the frequency of the clock signal may correspond to operating frequency OP-FRQ of application processor 120. Therefore, in response to clock control signal PLC that is generated based on a predicted operating state of central processing unit 126, the method of FIG. 1 may change operating frequency OP-FRQ of application processor 120 by changing a divide-ratio of the frequency divider of clock generating unit 124, and/or by changing the frequency of the output signal output from the PLL of clock generating unit 124. In addition, the method of FIG. 1 may finely adjust operating frequency OP-FRQ of application processor 120 by changing both the divide-ratio of the frequency divider of clock generating unit 124 and the frequency of the output signal output from the PLL of clock generating unit 124.

Figure 15:
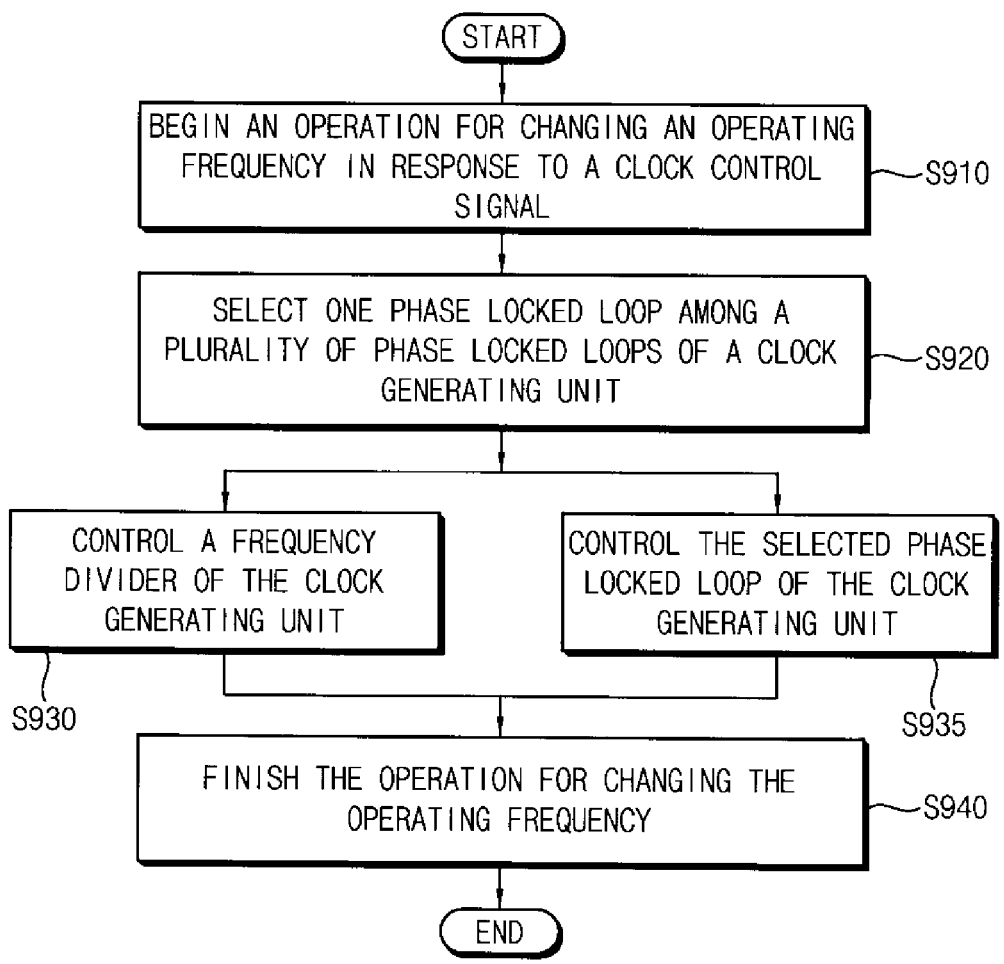
FIG. 15 is a flowchart illustrating an example in which the method of FIG. 1 changes an operating frequency of an application processor by controlling a frequency divider, multiple PLLs, and a multiplexer of a clock generating unit.

FIG. 15 is a flowchart illustrating an example in which the method of FIG. 1 changes an operating frequency of an application processor by controlling a frequency divider, multiple PLLs, and a multiplexer of a clock generating unit.

Referring to FIG. 15, using the method of FIG. 1, clock management unit 122 begins an operation for changing operating frequency OP-FRQ of application processor 120 in response to clock control signal PLC (S910), where clock control signal PLC is generated based on a predicted operating state of central processing unit 126, may select one PLL among multiple PLLs of clock generating unit 124 (S920), controls a frequency divider of clock generating unit 124 (S930) and/or the selected PLL of clock generating unit 124 (S935), and then finishes the operation for changing operating frequency OP-FRQ of application processor 120 (S940).

As described above, a clock signal output from clock generating unit 124 is input to central processing unit 126, and central processing unit 126 operates based on the clock signal. That is, a frequency of the clock signal corresponds to operating frequency OP-FRQ of application processor 120. Clock generating unit 124 comprises a frequency divider, multiple PLLs, and a multiplexer. Here, an output signal output from the selected PLL may pass through the frequency divider to be the clock signal. Thus, the frequency of the clock signal may be determined such that the frequency of the output signal is divided by the frequency divider.

In addition, the frequency of the clock signal corresponds to operating frequency OP-FRQ of application processor 120. Therefore, in response to clock control signal PLC that is generated based on a predicted operating state of central processing unit 126, the method of FIG. 1 changes operating frequency OP-FRQ of application processor 120 by selecting one PLL among the PLLs that output respective output signals having respective output frequencies (i.e., different output frequencies), and by changing a divide-ratio of the frequency divider of clock generating unit 124, and/or by changing the frequency of the output signal output from the selected PLL of clock generating unit 124. Further, the method of FIG. 1 may finely adjust operating frequency OP-FRQ of application processor 120 by changing both the divide-ratio of the frequency divider of clock generating unit 124 and the frequency of the output signal output from the selected PLL of clock generating unit 124 as well as selecting one of the PLLs that output respective output signals having respective output frequencies.

Figure 16:
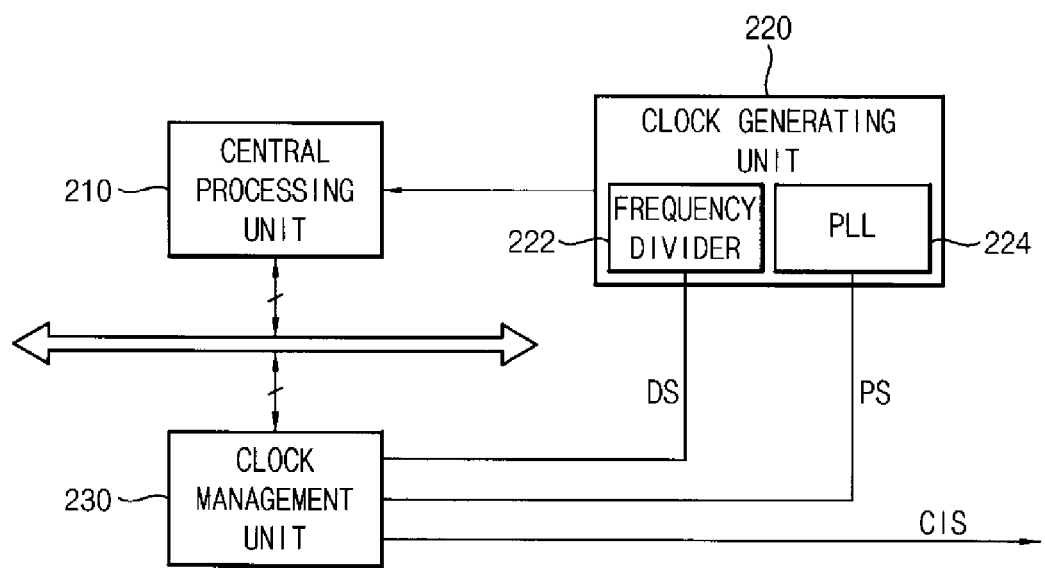
FIG. 16 is a block diagram illustrating an application processor according to an embodiment of the inventive concept.
Figure 17:
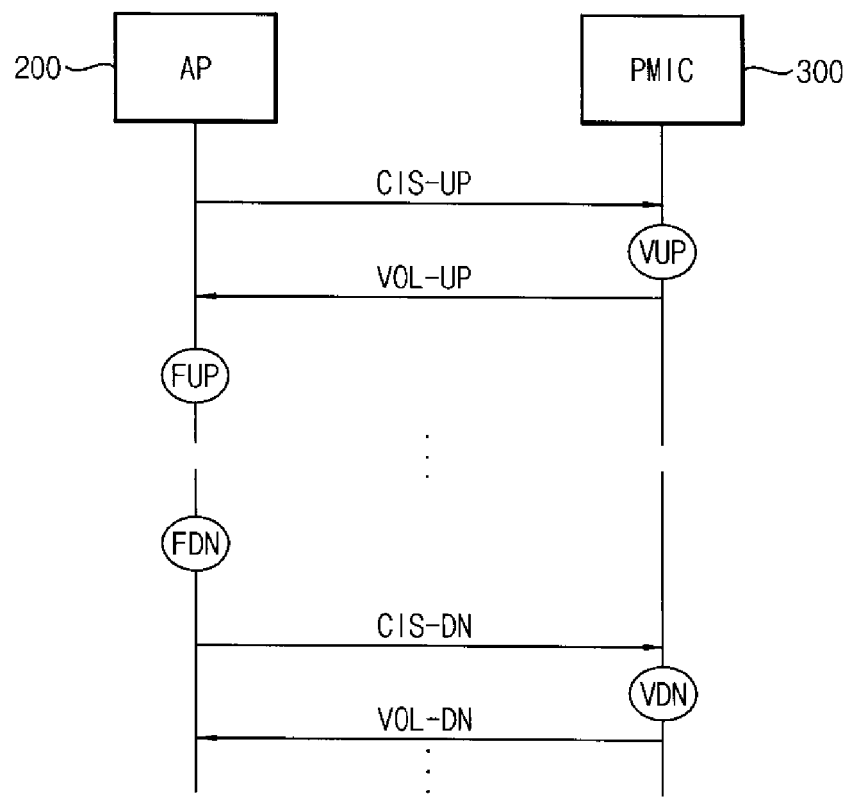
FIG. 17 is a conceptual diagram illustrating a process in which an application processor of FIG. 16 performs an interaction with a PMIC.

FIG. 16 is a block diagram illustrating an application processor according to an embodiment of the inventive concept. FIG. 17 is a conceptual diagram illustrating a process in which an application processor of FIG. 16 performs an interaction with a PMIC.

Referring to FIGS. 16 and 17, application processor 200 comprises a central processing unit 210, a clock generating unit 220, and a clock management unit 230.

Central processing unit 210 operates based on a clock signal CLK output from clock generating unit 220. Clock generating unit 220 generates clock signal CLK. Clock generating unit 220 comprises a frequency divider 222 and a PLL 224. Here, an output signal output from PLL 224 may pass through frequency divider 222 to be clock signal CLK. Thus, a frequency of clock signal CLK is determined such that an output frequency of the output signal output from PLL 224 is divided by frequency divider 222.

In addition, the frequency of clock signal CLK corresponds to an operating frequency of application processor 200. In another embodiment, clock generating unit 220 comprises a frequency divider, multiple PLLs, and a multiplexer. Here, an output signal output from one of the PLLs passes through the frequency divider to produce clock signal CLK. Thus, a frequency of clock signal CLK is determined such that an output frequency of the output signal output from one of the PLLs is divided by the frequency divider. In addition, the frequency of clock signal CLK corresponds to the operating frequency of application processor 200.

Clock management unit 230 predicts an operating state of central processing unit 210, provides operating frequency information CIS to an external PMIC 300, where operating frequency information CIS indicates a change of the operating frequency of application processor 200 corresponding to the frequency of clock signal CLK, and then changes the operating frequency of application processor 200 based on the predicted operating state of central processing unit 210. Here, an operating voltage of application processor 200 is changed by PMIC 300 based on operating frequency information CIS, where the operating voltage of application processor 200 is supplied by PMIC 300.

Where operating frequency information CIS provided from clock management unit 230 indicates an increase of the operating frequency of application processor 200, clock management unit 230 increases the operating frequency of application processor 200 after PMIC 300 increases the operating voltage of application processor 200. On the other hand, where operating frequency information CIS provided from clock management unit 230 indicates a decrease of the operating frequency of application processor 200, clock management unit 230 decreases the operating frequency of application processor 200 before PMIC 300 decreases the operating voltage of application processor 200.

In some embodiments, clock generating unit 220 comprises frequency divider 222 and PLL 224. In such embodiments, clock management unit 230 may change the operating frequency of application processor 200 by changing the frequency of clock signal CLK by controlling PLL 224 of clock generating unit 220. Alternatively, clock management unit 230 may change the operating frequency of application processor 200 by changing the frequency of clock signal CLK by controlling frequency divider 222 of clock generating unit 220. In yet another alternative, clock management unit 230 may change the operating frequency of application processor 200 by changing the frequency of clock signal CLK by controlling both frequency divider 222 and PLL 224 of clock generating unit 220. Here, because clock management unit 230 changes the frequency of the output signal output from PLL 224 of clock generating unit 220 as well as controls frequency divider 222 of clock generating unit 220, clock management unit 230 can finely adjust the operating frequency of application processor 200. These operations will be described below with reference to FIGS. 18 through 20.

In some other embodiments, clock generating unit 220 comprises a frequency divider, multiple PLLs, and a multiplexer. In such embodiments, clock management unit 230 may change the operating frequency of application processor 200 by changing the frequency of clock signal CLK by controlling the PLLs of clock generating unit 220. Alternatively, clock management unit 230 may change the operating frequency of application processor 200 by changing the frequency of clock signal CLK by selecting one of the PLLs of clock generating unit 220. In yet another alternative, clock management unit 230 may change the operating frequency of application processor 200 by changing the frequency of clock signal CLK by controlling the frequency divider of clock generating unit 220. In yet another alternative, clock management unit 230 may change the operating frequency of application processor 200 by changing the frequency of clock signal CLK by controlling the frequency divider of clock generating unit 220 as well as selecting one of the PLLs of clock generating unit 220. Further, clock management unit 230 may finely adjust the operating frequency of application processor 200 by changing the frequency of the output signal output from the selected PLL of clock generating unit 220. These operations will be described below with reference to FIGS. 21 and 22.

As illustrated in FIG. 17, a DVFS operation is performed for application processor 200 based on an interaction between application processor 200 and PMIC 300. Specifically, application processor 200 may predict an operating state of central processing unit 210. Here, clock management unit 230 of application processor 200 provides operating frequency information CIS indicating an increase of the operating frequency of application processor 200 to PMIC 300 (i.e., indicated as CIS-UP) where an increase of the operating frequency of application processor 200 is required based on the predicted operating state of central processing unit 210. Subsequently, PMIC 300 increases the operating voltage of application processor 200 (i.e., indicated as VUP), and provides a feedback signal indicating that the operating voltage of application processor 200 is increased to application processor 200 (i.e., indicated as VOL-UP).

Next, clock management unit 230 of application processor 200 increases the operating frequency of application processor 200 (i.e., indicated as FUP). On the other hand, clock management unit 230 of application processor 200 may decrease the operating frequency of application processor 200 (i.e., indicated as FDN) where a decrease of the operating frequency of application processor 200 is required based on the predicted operating state of central processing unit 210. Subsequently, clock management unit 230 of application processor 200 provides operating frequency information CIS indicating a decrease of the operating frequency of application processor 200 to PMIC 300 (i.e., indicated as CIS-DN). Next, PMIC 300 decreases the operating voltage of application processor 200 (i.e., indicated as VDN), and provides a feedback signal indicating that the operating voltage of application processor 200 is decreased to application processor 200 (i.e., indicated as VOL-DN).

As described above, a DVFS operation is performed for application processor 200 based on the predicted operating state of central processing unit 210 in real-time such that that clock management unit 230 predicts an operating state of central processing unit 210 (i.e., determines whether to increase or decrease the operating frequency of application processor 200), provides operating frequency information CIS to PMIC 300, where operating frequency information CIS is generated based on the predicted operating state of central processing unit 210, and changes the operating frequency of application processor 200 based on the predicted operating state of central processing unit 210. Here, PMIC 300 changes the operating voltage of application processor 200 based on operating frequency information CIS. Although it is illustrated in FIGS. 16 and 17 that clock management unit 230 receives a feedback signal from PMIC 300 to be informed that the operating voltage of application processor 200 is changed, the inventive concept is not limited thereto. For example, clock management unit 230 may determine that the operating voltage of application processor 200 is changed where a predetermined check time elapses after providing operating frequency information CIS to PMIC 300.

Figure 18:
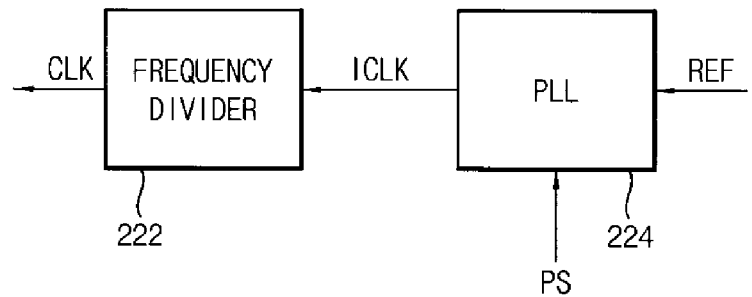
FIG. 18 is a block diagram illustrating an example in which an application processor of FIG. 16 performs a DVFS operation by controlling a PLL of a clock generating unit.

FIG. 18 is a block diagram illustrating an example in which an application processor of FIG. 16 performs a DVFS operation by controlling a PLL of a clock generating unit.

Referring to FIG. 18, clock generating unit 220 comprises frequency divider 222 and PLL 224, and clock management unit 230 changes an operating frequency of application processor 200 by controlling PLL 224 of clock generating unit 220. As described above, an output signal ICLK output from PLL 224 may pass through frequency divider 222 to be clock signal CLK. Thus, a frequency of clock signal CLK may be determined such that an output frequency of the output signal ICLK output from PLL 224 is divided by frequency divider 222.

In addition, the frequency of clock signal CLK may correspond to the operating frequency of application processor 200. Therefore, where the frequency of the output signal ICLK output from PLL 224 is changed, the operating frequency of application processor 200 may be changed because the frequency of clock signal CLK is changed. PLL 224 receives a reference frequency REF, and may output the output signal ICLK having the frequency.

The frequency may be the same as the reference frequency REF, or it may be generated by multiplying the reference frequency REF by an integer. Thus, where an increase of the operating frequency of application processor 200 is required based on a predicted operating state of central processing unit 210, clock management unit 230 may increase the frequency of the output signal ICLK by providing a first control signal PS that indicates an increase of the operating frequency of application processor 200 to PLL 224. As a result, the operating frequency of application processor 200 may be increased because the frequency of clock signal CLK is increased. On the other hand, where a decrease of the operating frequency of application processor 200 is required based on a predicted operating state of central processing unit 210, clock management unit 230 may decrease the frequency of the output signal ICLK by providing a second control signal PS that indicates a decrease of the operating frequency of application processor 200 to PLL 224. As a result, the operating frequency of application processor 200 may be decreased because the frequency of clock signal CLK is decreased.

Figure 19:
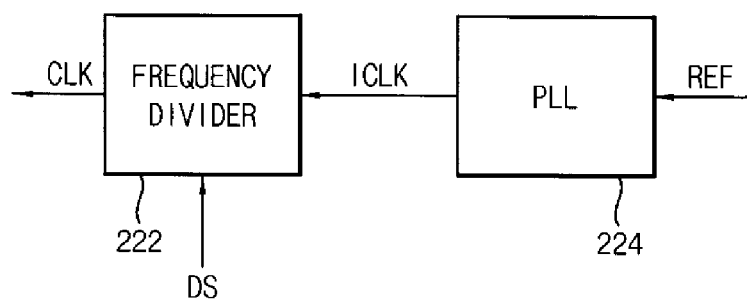
FIG. 19 is a block diagram illustrating an example in which an application processor of FIG. 16 performs a DVFS operation by controlling a frequency divider of a clock generating unit.

FIG. 19 is a block diagram illustrating an example in which an application processor of FIG. 16 performs a DVFS operation by controlling a frequency divider of a clock generating unit.

Referring to FIG. 19, clock generating unit 220 comprises frequency divider 222 and PLL 224, and clock management unit 230 changes an operating frequency of application processor 200 by controlling frequency divider 222 of clock generating unit 220. As described above, output signal ICLK output from PLL 224 passes through frequency divider 222 to produce clock signal CLK. Thus, a frequency of clock signal CLK is determined such that an output frequency of the output signal ICLK output from PLL 224 is divided by frequency divider 222. In addition, the frequency of clock signal CLK may correspond to the operating frequency of application processor 200. Therefore, where the frequency of clock signal CLK output from frequency divider 222 is changed (i.e., a divide-ratio of frequency divider 222 is changed), the operating frequency of application processor 200 may be changed.

Where an increase of the operating frequency of application processor 200 is required based on a predicted operating state of central processing unit 210, clock management unit 230 may increase the frequency of clock signal CLK by providing a third control signal DS that indicates an increase of the operating frequency of application processor 200 to frequency divider 222. As a result, the operating frequency of application processor 200 may be increased because the divide-ratio of frequency divider 222 is decreased. On the other hand, where a decrease of the operating frequency of application processor 200 is required based on a predicted operating state of central processing unit 210, clock management unit 230 may decrease the frequency of clock signal CLK by providing a fourth control signal DS that indicates a decrease of the operating frequency of application processor 200 to frequency divider 222. As a result, the operating frequency of application processor 200 may be decreased because the divide-ratio of frequency divider 222 is increased.

Figure 20:
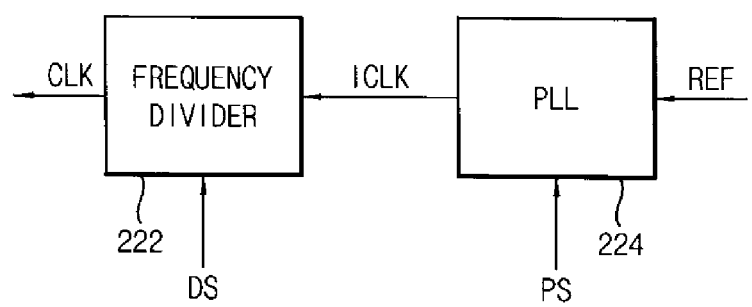
FIG. 20 is a block diagram illustrating an example in which an application processor of FIG. 16 performs a DVFS operation by controlling a frequency divider and a PLL of a clock generating unit.

FIG. 20 is a block diagram illustrating an example in which an application processor of FIG. 16 performs a DVFS operation by controlling a frequency divider and a PLL of a clock generating unit.

Referring to FIG. 20, clock generating unit 220 comprises frequency divider 222 and PLL 224, and clock management unit 230 changes an operating frequency of application processor 200 by controlling both frequency divider 222 and PLL 224 of clock generating unit 220. As described above, output signal ICLK output from PLL 224 passes through frequency divider 222 to produce clock signal CLK. Thus, a frequency of clock signal CLK is determined such that an output frequency of the output signal ICLK output from PLL 224 is divided by frequency divider 222. In addition, the frequency of clock signal CLK corresponds to the operating frequency of application processor 200. Therefore, where the frequency of the output signal ICLK output from PLL 224 is changed, and a divide-ratio of frequency divider 222 is changed (i.e., the frequency of clock signal CLK is changed), the operating frequency of application processor 200 is changed.

Where an increase of the operating frequency of application processor 200 is required based on a predicted operating state of central processing unit 210, clock management unit 230 increases the frequency of the output signal ICLK by providing a first control signal PS that indicates an increase of the operating frequency of application processor 200 to PLL 224, and may additionally increase the frequency of clock signal CLK by providing a third control signal DS that indicates an increase of the operating frequency of application processor 200 to frequency divider 222. As a result, the operating frequency of application processor 200 may be increased. On the other hand, where a decrease of the operating frequency of application processor 200 is required based on a predicted operating state of central processing unit 210, clock management unit 230 decreases the frequency of the output signal ICLK by providing a second control signal PS that indicates a decrease of the operating frequency of application processor 200 to PLL 224, and additionally decreases the frequency of clock signal CLK by providing a fourth control signal DS that indicates a decrease of the operating frequency of application processor 200 to frequency divider 222. As a result, the operating frequency of application processor 200 may be decreased. As described above, the operating frequency of application processor 200 may be finely adjusted by controlling both frequency divider 222 and PLL 224 of clock generating unit 220.

Figure 21:
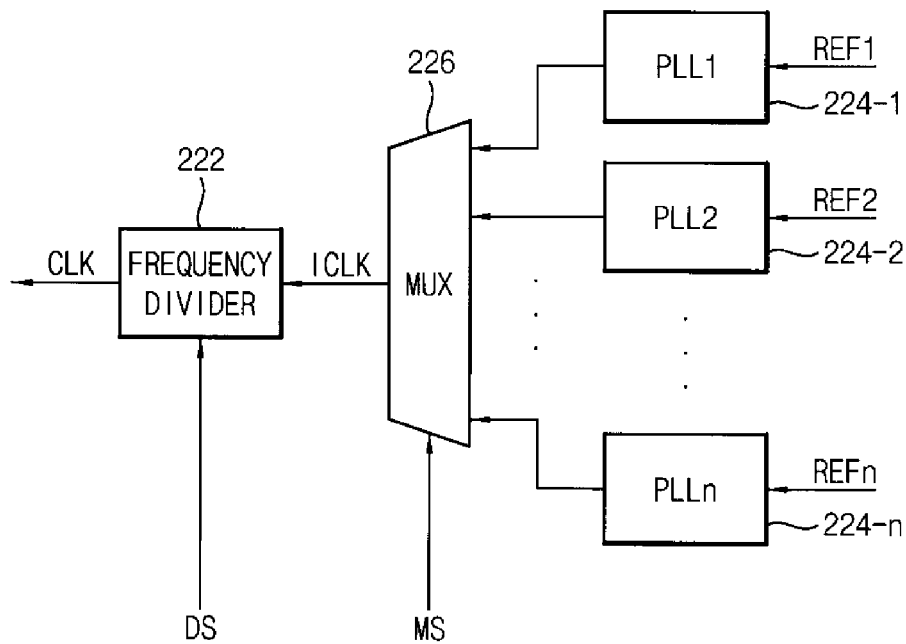
FIG. 21 is a block diagram illustrating an example in which an application processor of FIG. 16 performs a DVFS operation by controlling a frequency divider, multiple PLLs, and a multiplexer of a clock generating unit.

FIG. 21 is a block diagram illustrating an example in which an application processor of FIG. 16 performs a DVFS operation by controlling a frequency divider, multiple PLLs, and a multiplexer of a clock generating unit.

Referring to FIG. 21, clock generating unit 220 comprises frequency divider 222, PLLs 224-1 through 224-n, and multiplexer 226. Clock management unit 230 changes an operating frequency of application processor 200 by controlling both frequency divider 222 and multiplexer 226 of clock generating unit 220. As described above, output signal ICLK selected by multiplexer 226 among multiple output signals ICLK output from PLLs 224-1 through 224-n passes through frequency divider 222 to be clock signal CLK. Thus, a frequency of clock signal CLK is determined such that an output frequency of the output signal ICLK output from a selected PLL 224-i is divided by frequency divider 222. In addition, the frequency of clock signal CLK may correspond to the operating frequency of application processor 200.

PLLs 224-1 through 224-n receive respective reference frequencies REF1 through REFn, and they output respective output signals ICLK having respective output frequencies. The respective output frequencies may be the same as the respective reference frequencies REF1 through REFn, or they may be generated by multiplying the respective reference frequencies REF1 through REFn by an integer. Therefore, where a divide-ratio of frequency divider 222 is changed (i.e., the frequency of clock signal CLK is changed), or where the selected PLL 224-i is changed, the operating frequency of application processor 200 may be changed.

Where an increase of the operating frequency of application processor 200 is required based on a predicted operating state of central processing unit 210, clock management unit 230 may select output signal ICLK having an output frequency higher than a previous output frequency by providing a fifth control signal MS that indicates an increase of the operating frequency of application processor 200 to multiplexer 226. On the other hand, where a decrease of the operating frequency of application processor 200 is required based on a predicted operating state of central processing unit 210, clock management unit 230 may select output signal ICLK having an output frequency lower than a previous output frequency by providing a sixth control signal MS that indicates a decrease of the operating frequency of application processor 200 to multiplexer 226. For example, where an increase of the operating frequency of application processor 200 is required based on a predicted operating state of central processing unit 210, clock management unit 230 may increase the operating frequency of application processor 200 by providing a third control signal DS that indicates an increase of the operating frequency of application processor 200 to frequency divider 222. On the other hand, where a decrease of the operating frequency of application processor 200 is required based on a predicted operating state of central processing unit 210, clock management unit 230 may decrease the operating frequency of application processor 200 by providing a fourth control signal DS that indicates a decrease of the operating frequency of application processor 200 to frequency divider 222.

In addition, where an increase of the operating frequency of application processor 200 is required based on a predicted operating state of central processing unit 210, clock management unit 230 selects output signal ICLK having an output frequency higher than a previous output frequency by providing the fifth control signal MS that indicates an increase of the operating frequency of application processor 200 to multiplexer 226, and it increases the operating frequency of application processor 200 by providing the third control signal DS that indicates an increase of the operating frequency of application processor 200 to frequency divider 222. On the other hand, where a decrease of the operating frequency of application processor 200 is required based on a predicted operating state of central processing unit 210, clock management unit 230 selects output signal ICLK having an output frequency lower than a previous output frequency by providing the sixth control signal MS that indicates a decrease of the operating frequency of application processor 200 to multiplexer 226, and it decreases the operating frequency of application processor 200 by providing the fourth control signal DS that indicates a decrease of the operating frequency of application processor 200 to frequency divider 222. As a result, the operating frequency of application processor 200 may be finely adjusted.

Figure 22:
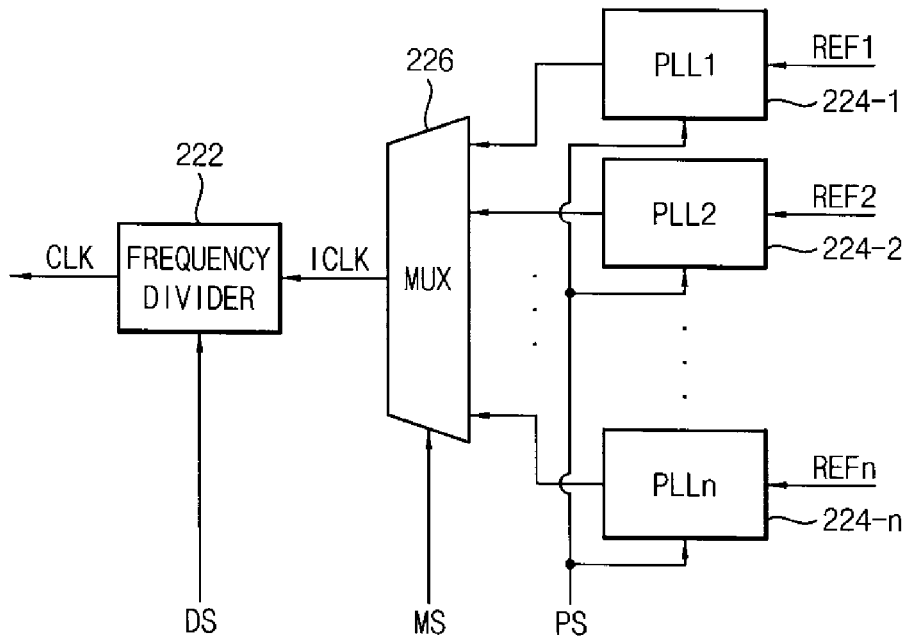
FIG. 22 is a block diagram illustrating another example in which an application processor of FIG. 16 performs a DVFS operation by controlling a frequency divider, multiple PLLs, and a multiplexer of a clock generating unit.

FIG. 22 is a block diagram illustrating another example in which an application processor of FIG. 16 performs a DVFS operation by controlling a frequency divider, multiple PLLs, and a multiplexer of a clock generating unit.

Referring to FIG. 22, clock generating unit 220 comprises frequency divider 222, PLLs 224-1 through 224-n, and multiplexer 226, and clock management unit 230 changes an operating frequency of application processor 200 by controlling frequency divider 222, multiplexer 226, and/or PLLs 224-1 through 224-n of clock generating unit 220. Because it is described in FIG. 21 that the operating frequency of application processor 200 is changed by controlling frequency divider 222, multiplexer 226, and/or PLLs 224-1 through 224-n of clock generating unit 220, a description of this feature will not be repeated. As illustrated in FIG. 22, clock management unit 230 selects one PLL 224-i among PLLs 224-1 through 224-n that output respective output signals ICLK having respective output frequencies (i.e., different output frequencies). It also change a divide-ratio of frequency divider 222, and changes an output frequency of the output signal ICLK output from the selected PLL 224-i. In other words, where an increase of the operating frequency of application processor 200 is required based on a predicted operating state of central processing unit 210, clock management unit 230 additionally increases the frequency of the output signal ICLK output from the selected PLL 224-i by providing a first control signal PS that indicates an increase of the operating frequency of application processor 200 to the selected PLL 224-i. On the other hand, where a decrease of the operating frequency of application processor 200 is required based on a predicted operating state of central processing unit 210, clock management unit 230 additionally decreases the frequency of the output signal ICLK output from the selected PLL 224-i by providing a second control signal PS that indicates a decrease of the operating frequency of application processor 200 to the selected PLL 224-i. As a result, the operating frequency of application processor 200 may be finely adjusted.

Figure 23:
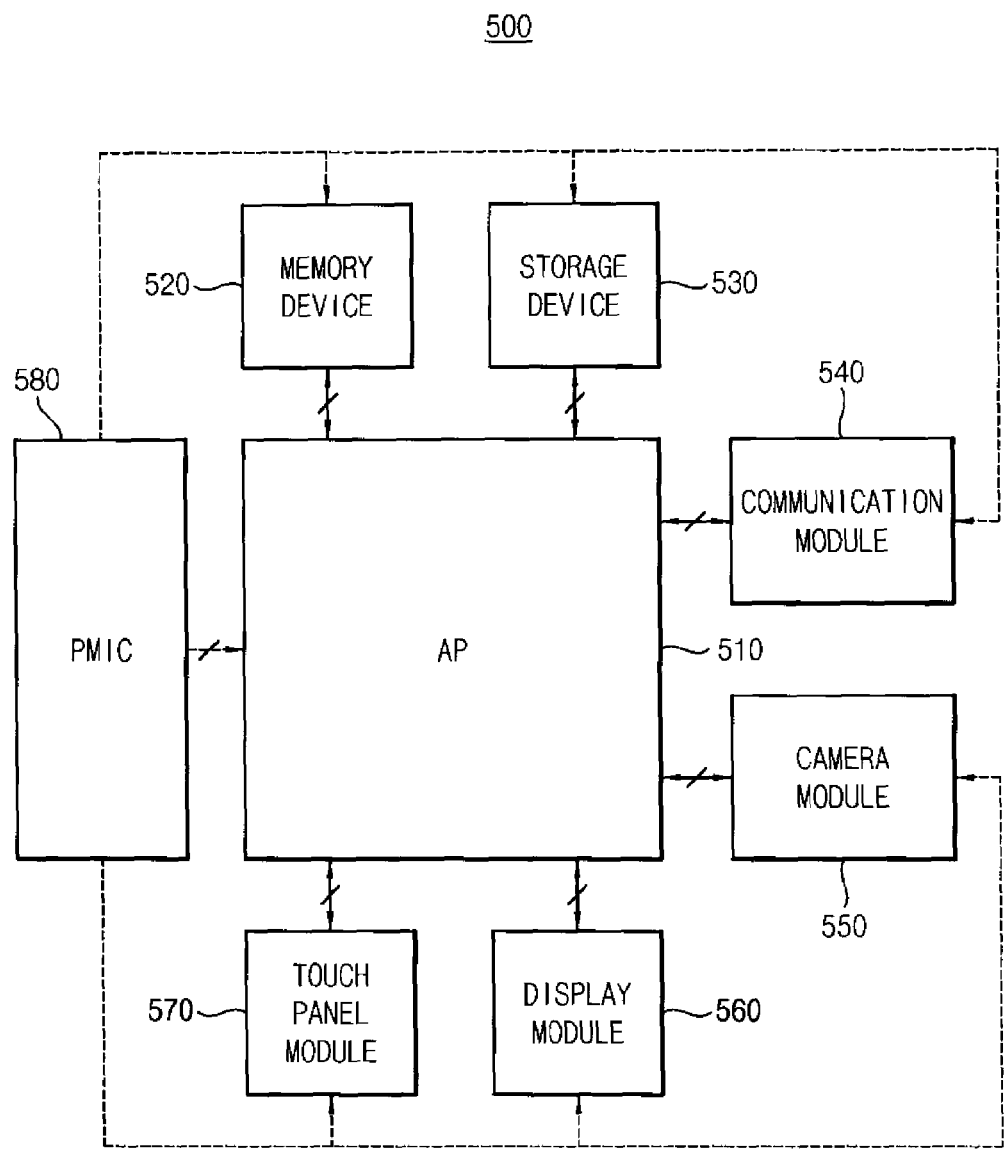
FIG. 23 is a block diagram illustrating a mobile device according to an embodiment of the inventive concept.
Figure 24:
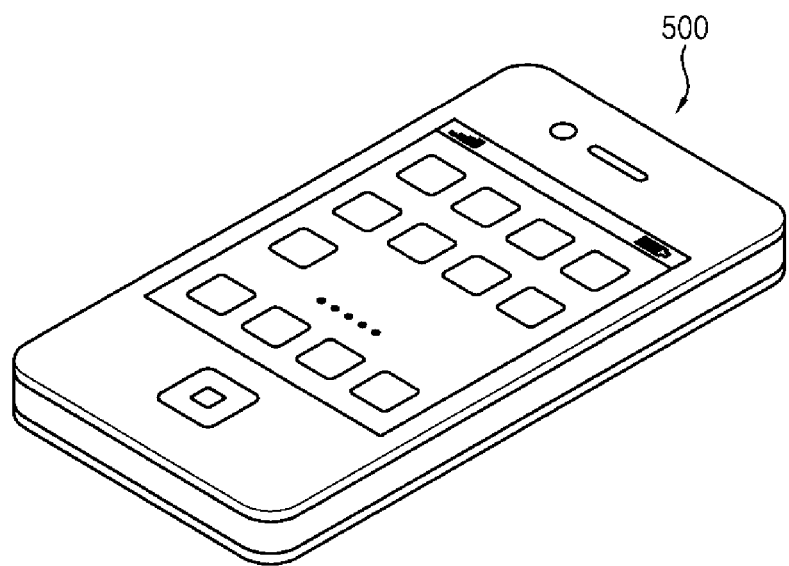
FIG. 24 is a diagram illustrating an example in which a mobile device of FIG. 23 is implemented as a smart-phone.

FIG. 23 is a block diagram illustrating a mobile device according to an embodiment of the inventive concept. FIG. 24 is a diagram illustrating an example in which a mobile device of FIG. 23 is implemented as a smart-phone.

Referring to FIGS. 23 and 24, a mobile device 500 comprises an application processor 510, a memory device 520, a storage device 530, multiple functional modules 540, 550, 560, and 570, and a PMIC 580 that provides an operating voltage to application processor 510, memory device 520, storage device 530, and functional modules 540, 550, 560, and 570, respectively. For example, as illustrated in FIG. 23, mobile device 500 may be implemented as a smart-phone.

Application processor 510 controls overall operations of mobile device 500. For instance, application processor 510 controls memory device 520, storage device 530, and functional modules 540, 550, 560, and 570. Application processor 510 predicts an operating state of a central processing unit in application processor 510, outputs operating frequency information that is generated based on the predicted operating state of the central processing unit, where the operating frequency information indicates whether to increase or decrease an operating frequency of application processor 510, and it changes the operating frequency of application processor 510 based on the predicted operating state of the central processing unit in hardware.

For this operation, application processor 510 may comprise a central processing unit that operates based on a clock signal, a clock generating unit that generates the clock signal to provide the clock signal to the central processing unit, and a clock management unit that predicts the operating state of the central processing unit, provides the operating frequency information to PMIC 580 based on the predicted operating state of the central processing unit, and changes the operating frequency of application processor 510 based on the predicted operating state of the central processing unit. PMIC 580 changes an operating voltage of application processor 510 based on the operating frequency information indicating a change of the operating frequency of application processor 510. As a result, an interaction between application processor 510 and PMIC 580 may be performed at high speed, and thus a DVFS operation may be performed for application processor 510 based on the predicted operating state of the central processing unit in real-time.

Memory device 520 and storage device 530 store data for operations of mobile device 500. Memory device 520 may correspond to a volatile semiconductor memory device such as a dynamic random access memory (DRAM) device, a static random access memory (SRAM) device, a mobile DRAM, etc. In addition, storage device 530 may correspond to a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. In some embodiments, storage device 530 may correspond to a solid state drive (SSD) device, a hard disk drive (HDD) device, a CD-ROM device, etc.

Functional modules 540, 550, 560, and 570 perform various functions of mobile device 500. For example, mobile device 500 may comprise a communication module 540 that performs a communication function (e.g., a code division multiple access (CDMA) module, a long term evolution (LTE) module, a radio frequency (RF) module, an ultra wideband (UWB) module, a wireless local area network (WLAN) module, a worldwide interoperability for microwave access (WIMAX) module, etc), a camera module 550 that performs a camera function, a display module 560 that performs a display function, a touch panel module 570 that performs a touch sensing function, etc.

In some embodiments, mobile device 500 further comprises a global positioning system (GPS) module, a microphone (MIC) module, a speaker module, a gyroscope module, etc. However, a kind of the functional modules 540, 550, 560, and 570 in mobile device 500 is not limited thereto. As described above, mobile device 500 comprises application processor 510, and thus mobile device 500 may efficiently reduce power consumption because application processor 510 predicts the operating state of the central processing unit, and changes the operating frequency and the operating voltage of application processor 510 based on the predicted operating state of the central processing unit in real-time. Although it is illustrated in FIGS. 23 and 24 that application processor 510 is included in mobile device 500, application processor 510 according to an embodiment of the inventive concept may be applied to any electronic device that employs a DVFS technique (i.e., performs a DVFS operation).

The inventive concept may be applied to an electronic device having an application processor. For example, the inventive concept may be applied to a computer, a laptop, a digital camera, a cellular phone, a smart-phone, a smart-pad, a personal digital assistants (PDA), a portable multimedia player (PMP), an MP3 player, a navigation system, a video camcorder, a portable game console, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A method of performing a dynamic voltage and frequency scaling operation, the method comprising:
   controlling a clock management unit (CMU) to predict an operating state of a central processing unit (CPU) and to provide operating frequency information to a power management integrated circuit (PMIC) based on the predicted operating state of the CPU, the operating frequency information indicating a change of an operating frequency of an application processor; and
   controlling the PMIC to change an operating voltage of the application processor based on the operating frequency information provided from the clock management unit;
   when the operating frequency information indicates an increase of the operating frequency of the application processor, controlling the CMU to increase the operating frequency of the application processor after controlling the PMIC to increase the operating voltage of the application processor; and
   when the operating frequency information indicates a decrease of the operating frequency of the application processor, controlling the CMU to decrease the operating frequency of the application processor before controlling the PMIC to decrease the operating voltage of the application processor, wherein:
   the operating frequency of the application processor corresponds to a frequency of a clock signal that is output from a clock generating unit, and the frequency of the clock signal is determined by the CMU,
   the clock generating unit comprises multiple phase locked loops (PLLs), a multiplexer, and a frequency divider, and
   the frequency of the clock signal is determined such that an output frequency of one output signal selected by the multiplexer among multiple output signals output from the PLLs is divided by the frequency divider.

2. The method of claim 1, wherein the operating frequency of the application processor is changed by controlling the CMU to control the PLLs.

3. The method of claim 1, wherein the operating frequency of the application processor is changed by controlling the CMU to control the frequency divider.

4. The method of claim 1, wherein the operating frequency of the application processor is changed by controlling the CMU to control both the PLLs and the frequency divider.

5. The method of claim 1, wherein the operating frequency of the application processor is changed by controlling the CMU to select one PLL among the PLLs.

6. The method of claim 1, wherein the operating frequency of the application processor is changed by controlling the CMU to control the frequency divider.

7. The method of claim 1, wherein the operating frequency of the application processor is changed by controlling the CMU to select one PLL among the PLLs, and to control the frequency divider.

8. An application processor comprising:
   a central processing unit configured to operate based on a clock signal;
   a clock generating unit configured to generate the clock signal; and
   a clock management unit (CMU) configured to predict an operating state of the central processing unit, to provide operating frequency information to a power management integrated circuit (PMIC) based on the predicted operating state of the central processing unit, and to change an operating frequency of the application processor based on the predicted operating state of the central processing unit, the operating frequency information indicating a change of the operating frequency of the application processor corresponding to a frequency of the clock signal, wherein:
   an operating voltage of the application processor supplied by the PMIC is changed based on the operating frequency information,
   the clock generating unit comprises multiple phase locked loops (PLLs), a multiplexer, and a frequency divider,
   the frequency of the clock signal is determined such that an output frequency of one output signal selected by the multiplexer among multiple output signals output from the PLLs is divided by the frequency divider,
   the CMU increases the operating frequency of the application processor after the PMIC increases the operating voltage of the application processor when the operating frequency information indicates an increase of the operating frequency of the application processor, and
   the CMU decreases the operating frequency of the application processor before the PMIC decreases the operating voltage of the application processor when the operating frequency information indicates a decrease of the operating frequency of the application processor.

9. The application processor of claim 8, wherein:
the CMU increases the operating frequency of the application processor by increasing the frequency of the one output signal using a first control signal indicating the increase of the operating frequency of the application processor to the PLLs, and
the CMU decreases the operating frequency of the application processor by decreasing the frequency of the one output signal using a second control signal indicating the decrease of the operating frequency of the application processor to the PLLs.

10. The application processor of claim 8, wherein:
the CMU increases the operating frequency of the application processor by increasing the frequency of the clock signal using a first control signal indicating the increase of the operating frequency of the application processor to the frequency divider, and
the CMU decreases the operating frequency of the application processor by decreasing the frequency of the clock signal using a second control signal indicating the decrease of the operating frequency of the application processor to the frequency divider.

11. The application processor of claim 8, wherein:
the CMU increases the operating frequency of the application processor by increasing the frequency of the one output signal using a first control signal indicating the increase of the operating frequency of the application processor to the PLLs, and by increasing the frequency of the clock signal using a third control signal indicating the increase of the operating frequency of the application processor to the frequency divider, and
the CMU decreases the operating frequency of the application processor by decreasing the frequency of the one output signal using a second control signal indicating the decrease of the operating frequency of the application processor to the PLLs, and by decreasing the frequency of the clock signal using a fourth control signal indicating the decrease of the operating frequency of the application processor to the frequency divider.

12. The application processor of claim 8, wherein:
the CMU increases the operating frequency of the application processor by increasing the output frequencies of the output signals using a first control signal indicating the increase of the operating frequency of the application processor to the PLLs, and
the CMU decreases the operating frequency of the application processor by decreasing the output frequencies of the output signals using a second control signal indicating the decrease of the operating frequency of the application processor to the PLLs.

13. The application processor of claim 8, wherein:
the CMU increases the operating frequency of the application processor by increasing the frequency of the clock signal using a first control signal indicating the increase of the operating frequency of the application processor to the frequency divider, and
the CMU decreases the operating frequency of the application processor by decreasing the frequency of the clock signal using a second control signal indicating the decrease of the operating frequency of the application processor to the frequency divider.

14. The application processor of claim 8, wherein:
the CMU increases the operating frequency of the application processor by selecting an output signal having an output frequency higher than a previous output frequency among the output signals using a first control signal indicating the increase of the operating frequency of the application processor to the multiplexer, and
the CMU decreases the operating frequency of the application processor by selecting an output signal having an output frequency lower than the previous output frequency among the output signals using a second control signal indicating the decrease of the operating frequency of the application processor to the multiplexer.

15. The application processor of claim 8, wherein:
the CMU increases the operating frequency of the application processor by selecting an output signal having an output frequency higher than a previous output frequency among the output signals using a first control signal indicating the increase of the operating frequency of the application processor to the multiplexer, and by increasing the frequency of the clock signal using a third control signal indicating the increase of the operating frequency of the application processor to the frequency divider, and
the CMU decreases the operating frequency of the application processor by selecting an output signal having an output frequency lower than the previous output frequency among the output signals using a second control signal indicating the decrease of the operating frequency of the application processor to the multiplexer, and by decreasing the frequency of the clock signal using a fourth control signal indicating the decrease of the operating frequency of the application processor to the frequency divider.

16. The application processor of claim 15, wherein:
the CMU increases the operating frequency of the application processor by increasing the output frequencies of the output signals using a fifth control signal indicating the increase of the operating frequency of the application processor to the PLLs, and
the CMU decreases the operating frequency of the application processor by decreasing the output frequencies of the output signals using a sixth control signal indicating the decrease of the operating frequency of the application processor to the PLLs.

17. A mobile device comprising:
at least one functional module;
an application processor configured to predict an operating state of a central processing unit (CPU), to output operating frequency information based on a predicted operating state of the CPU, and to change an operating frequency of the application processor based on the predicted operating state of the CPU in hardware, the operating frequency information indicating a change of the operating frequency of the application processor; and
a power management integrated circuit (PMIC) configured to change an operating voltage of the application processor based on the operating frequency information, wherein:
the application processor comprises:
the CPU configured to operate based on a clock signal; a clock generating unit configured to generate the clock signal, the clock generating unit comprises multiple phase locked loops (PLLs), a multiplexer, and a frequency divider, and wherein the frequency of the clock signal is determined such that an output frequency of one output signal selected by the multiplexer among multiple output signals output from the PLLs is divided by the frequency divider; and a clock management unit (CMU) configured to predict the operating state of the CPU, to provide the operating frequency information to the PMIC based on the predicted operating state of the CPU, and to change the operating frequency of the application processor based on the predicted operating state of the CPU, the CMU increases the operating frequency of the application processor after the PMIC increases the operating voltage of the application processor when the operating frequency information indicates an increase of the operating frequency of the application processor, and the CMU decreases the operating frequency of the application processor before the PMIC decreases the operating voltage of the application processor when the operating frequency information indicates a decrease of the operating frequency of the application processor.

18. A method of operating an apparatus comprising an application processor, a clock management unit (CMU), and a power management integrated circuit (PMIC), the method comprising:

operating the CMU to predict an operating state of a central processing unit (CPU) in the application processor and to provide operating frequency information to the PMIC based on the predicted operating state;

operating the PMIC to increase an operating voltage of the application processor before the CMU increases an operating frequency of the application processor when the operating frequency information indicates an increase in an operating frequency of the application processor; and operating the PMIC to decrease the operating voltage of the application processor after the CMU decreases the operating frequency of the application processor when the operating frequency information indicates a decrease in the operating frequency of the application processor, wherein:

the operating frequency of the application processor corresponds to a frequency of a clock signal that is output from a clock generating unit, and the frequency of the clock signal is determined by the CMU, the clock generating unit comprises multiple phase locked loops (PLLs), a multiplexer, and a frequency divider, and the frequency of the clock signal is determined such that an output frequency of one output signal selected by the multiplexer among multiple output signals output from the PLLs is divided by the frequency divider.

19. The method of claim 18, wherein the operating frequency of the application processor is changed by controlling the CMU to control the PLLs.

20. The method of claim 18, wherein the operating frequency of the application processor is changed by controlling the CMU to control the frequency divider.

* * * * *